(12) United States Patent
Dugan et al.

(10) Patent No.: US 7,061,923 B2
(45) Date of Patent: *Jun. 13, 2006

(54) METHOD AND APPARATUS FOR MANAGING LOCAL RESOURCES AT SERVICE NODES IN AN INTELLIGENT NETWORK

(75) Inventors: Andrew J. Dugan, Superior, CO (US); Allen Holmes, Colorado Springs, CO (US); Kelvin R. Porter, Dallas, TX (US); Terence A. Robb, Colorado Springs, CO (US)

(73) Assignee: MCI, LLC.

( * ) Notice: Subject to any disclaimer, the term of this patent is extended or adjusted under 35 U.S.C. 154(b) by 819 days.

This patent is subject to a terminal disclaimer.

(21) Appl. No.: 10/026,850

(22) Filed: Dec. 19, 2001
(Under 37 CFR 1.47)

(65) Prior Publication Data
US 2002/0083166 A1  Jun. 27, 2002

Related U.S. Application Data

(63) Continuation of application No. 09/420,654, filed on Oct. 19, 1999, now Pat. No. 6,425,005, which is a continuation-in-part of application No. 09/128,937, filed on Aug. 5, 1998, now Pat. No. 6,418,461.

(60) Provisional application No. 60/104,890, filed on Oct. 20, 1998, provisional application No. 60/061,173, filed on Oct. 6, 1997.

(51) Int. Cl.
*H04L 12/28* (2006.01)
*G06F 15/16* (2006.01)
*H04M 7/00* (2006.01)

(52) U.S. Cl. ............... 370/396; 370/400; 379/221.08; 709/201; 709/223

(58) Field of Classification Search ............... 709/200, 709/202, 203, 206, 213, 217, 218, 219, 223, 709/224, 225, 201; 379/111, 114, 190, 197, 379/219, 220, 221.08; 370/396, 400
See application file for complete search history.

(56) References Cited

U.S. PATENT DOCUMENTS

| | | | |
|---|---|---|---|
| 4,713,806 A | 12/1987 | Oberlander | |
| 5,157,390 A | 10/1992 | Yoshie et al. | |
| 5,168,515 A | 12/1992 | Grechter et al. | |
| 5,185,782 A * | 2/1993 | Srinivasan | 379/210.01 |
| 5,323,452 A | 6/1994 | Dickman et al. | |
| 5,335,268 A | 8/1994 | Kelly, Jr. et al. | |
| 5,450,480 A | 9/1995 | Man et al. | |
| 5,463,682 A | 10/1995 | Fisher et al. | |
| 5,475,817 A | 12/1995 | Waldo et al. | |
| 5,537,466 A * | 7/1996 | Taylor et al. | 379/221.11 |
| 5,551,035 A | 8/1996 | Arnold et al. | |
| 5,619,557 A | 4/1997 | Van Berkum | |
| 5,644,629 A | 7/1997 | Chow | |
| 5,655,081 A * | 8/1997 | Bonnell et al. | 709/202 |
| 5,664,102 A | 9/1997 | Faynberg | |
| 5,742,668 A | 4/1998 | Pepe et al. | |
| 5,748,896 A | 5/1998 | Daly et al. | |
| 5,754,639 A | 5/1998 | Flockhart et al. | |
| 5,754,939 A | 5/1998 | Herz et al. | |
| 5,774,668 A | 6/1998 | Choquier et al. | |
| 5,799,153 A | 8/1998 | Blau et al. | |
| 5,812,533 A | 9/1998 | Cox et al. | |
| 5,825,865 A | 10/1998 | Oberlander et al. | |
| 5,825,869 A | 10/1998 | Brooks et al. | |
| 5,826,268 A | 10/1998 | Shaefer et al. | |
| 5,828,747 A | 10/1998 | Fisher et al. | |
| 5,838,970 A | 11/1998 | Thomas | |
| 5,867,498 A | 2/1999 | Gillman et al. | |
| 5,881,134 A | 3/1999 | Foster et al. | |
| 5,892,946 A | 4/1999 | Woster et al. | |
| 5,898,839 A | 4/1999 | Berteau | |
| 5,907,607 A | 5/1999 | Waters et al. | |
| 5,912,961 A | 6/1999 | Taylor et al. | |
| 5,915,008 A * | 6/1999 | Dulman | 379/221.08 |
| 5,923,892 A | 7/1999 | Levy | |
| 5,940,616 A | 8/1999 | Wang | |
| 5,958,016 A * | 9/1999 | Chang et al. | 709/229 |
| 5,966,434 A | 10/1999 | Schafer | |
| 5,991,389 A | 11/1999 | Ram et al. | |

| | | | |
|---|---|---|---|
| 5,991,811 A | 11/1999 | Ueno et al. |
| 5,999,965 A | 12/1999 | Kelly |
| 6,014,700 A | 1/2000 | Bainbridge et al. |
| 6,028,924 A | 2/2000 | Ram et al. |
| 6,041,109 A | 3/2000 | Cardy et al. |
| 6,041,117 A | 3/2000 | Androski |
| 6,044,142 A | 3/2000 | Hammarstrom et al. |
| 6,044,264 A | 3/2000 | Huotari et al. |
| 6,044,368 A | 3/2000 | Powers |
| 6,078,586 A | 6/2000 | Dugan et al. |
| 6,085,030 A | 7/2000 | Whitehead et al. |
| 6,101,616 A | 8/2000 | Joubert et al. |
| 6,122,510 A | 9/2000 | Granberg |
| 6,134,530 A | 10/2000 | Bunting et al. |
| 6,182,109 B1 | 1/2001 | Sharma et al. |
| 6,208,856 B1 | 3/2001 | Jonsson |
| 6,209,018 B1 | 3/2001 | Ben-Shachar et al. |
| 6,266,406 B1 | 7/2001 | Mercouroff et al. |
| 6,295,353 B1 | 9/2001 | Flockhart et al. |
| 6,310,949 B1 | 10/2001 | Taylor et al. |
| 6,321,323 B1 | 11/2001 | Nugroho et al. |
| 6,324,275 B1 | 11/2001 | Yagel et al. |
| 6,327,355 B1 | 12/2001 | Britt |
| 6,330,326 B1 | 12/2001 | Whitt |
| 6,333,931 B1 | 12/2001 | LaPier et al. |
| 6,360,266 B1 | 3/2002 | Pettus |
| 6,363,411 B1 | 3/2002 | Dugan et al. |
| 6,366,657 B1 | 4/2002 | Yagel et al. |
| 6,393,481 B1 | 5/2002 | Deo et al. |
| 6,418,461 B1 | 7/2002 | Barnhouse et al. |
| 6,430,600 B1 | 8/2002 | Yokote |
| 6,453,038 B1 | 9/2002 | McFarlane et al. |
| 6,564,270 B1 | 5/2003 | Andert et al. |
| 6,628,769 B1 | 9/2003 | Vleer et al. |

FOREIGN PATENT DOCUMENTS

| | | |
|---|---|---|
| WO | 95/23483 | 8/1995 |
| WO | 96/13949 | 5/1996 |
| WO | 96/20448 | 7/1996 |
| WO | 98/09421 | 3/1998 |
| WO | 00/23898 | 4/2000 |
| WO | 00/24182 | 4/2000 |

OTHER PUBLICATIONS

Stowe, M. "Service Management for the Advanced Intelligent Network" Countdown to the New Milennium. Phoenix, Dec. 2-5, 1991, Proceeding of the Global Telecommunications Conference, (Globecom), New York, IEEE, US, vol. 3, Dec. 2, 1991, pp. 1667-1671.

* cited by examiner

*Primary Examiner*—Alpus H. Hsu
*Assistant Examiner*—Lina Yang

(57) ABSTRACT

A resource management system for an intelligent communications network having one or more distributed service nodes, each service node for providing services relating to an event received at a network resource associated with a service node. The system comprising a first processing tier comprising one or more local execution environments located at a node, each execution environment including a mechanism for instantiating one or more service objects capable of performing event services at a first local execution environment, and, for generating status information relating to executing service objects; and, a second processing tier associated with a service node and including a system processor for tracking status and availability of service objects and local execution environments. Upon receipt of service requests, the system processor communicates with the first processing tier for receiving the status information and initiating service object instantiation in the one or more local execution environments in the first processing tier at the node based upon the status and availability information of the requested service object.

26 Claims, 18 Drawing Sheets

METHOD AND APPARATUS FOR MANAGING LOCAL RESOURCES AT SERVICE NODES IN AN INTELLIGENT NETWORK

CROSS-REFERENCE TO RELATED APPLICATION

This Application is a Continuation of commonly assigned, U.S. patent application Ser. No. 09/420,654 filed Oct. 19, 1999 now U.S. Pat. No. 6,425,005 entitled "Method And Apparatus for Managing Local Resources at Service Nodes in an Intelligent Network," now allowed, which itself is a Continuation-In-Part of commonly assigned, U.S. patent application Ser. No. 09/128,937 filed Aug. 5, 1998 now U.S. Pat. No. 6,418,461 entitled "Intelligent Call Platform for an Intelligent Network Distributed Architecture," which claims the benefit of U.S. Provisional Application Ser. No. 60/061, 173, filed Oct. 6, 1997 all of which are incorporated herein in their entirety by reference thereto. This application additionally claims the benefit of U.S. Provisional Application Ser. No. 60/104,890 filed Oct. 20, 1998 herein incorporated by reference.

FIELD OF THE INVENTION

The present invention is related generally to Intelligent Networks, and, more particularly, to a novel system and methodology for managing service processing resources employed for performing services in response to service requests received at service nodes of an intelligent network.

BACKGROUND OF THE INVENTION

A network service is a function performed by a communications network, such as data or telephony, and its associated resources in response to an interaction with one or more subscribers. For example, a telephony network resident service, such as call forwarding or voice mail access, can be invoked by a subscriber by dialing a special sequence of digits. Other network services may be directed at assisting a network owner with security, validation, and authentication. Adding or modifying a service requires changes to be made in the communications network.

Most conventional telecommunication networks are composed of interconnected switches and communication services. These switches are controlled by integrated or imbedded processors operated by proprietary software or firmware designed by the switch manufacturer. Typically, the switch manufacturer's software or firmware must support all functional aspects of service processing, call processing, facility processing and network management. This means that when a network owner wishes to implement a new service or modify an existing service, the software of every switch in the network must be revised by the various switch manufacturers.

The fact that the network contains different switch models from different manufacturers requires careful development, testing and deployment of the new software. The time required to develop, test and deploy the new software is lengthened because the code size at each switch grows larger and more complex with each now revision. Thus, this process can take several years. In addition, this increased complexity further burdens the switch processors, increases the chances for switch malfunction, and may require the modification or replacement of the switch.

Moreover, the fact that multiple network owners depend upon a common set of switch manufacturers results in two undesirable situations that limit competition. First, a manufacturers' software release may attempt to incorporate changes requested by several network owners, thus preventing the network owners from truly differentiating their services from the services provided by their competition. This also forces some network owners to wait until the manufacturer incorporates requests from other network owners into the new release. Second, a switch software release incorporating a function as requested by one network owner to implement a new service can unintentionally become accessible to other network owners.

These problems have become intolerable as the demand for new network services has increased exponentially over the last five to ten years due to increased subscriber mobility, increased variety and bandwidth of traffic, dissolution of traditional numbering plans, more sophisticated services and increased competition. Thus, it is widely recognized that new network architectures need to incorporate a more flexible way of creating, deploying and executing service logic. In order to fully appreciate the novel architecture of the present invention hereinafter described, the following description of the relevant prior art is provided with reference to FIGS. 1–4.

Referring to FIG. 1, a logical representation of various switching architectures, including the present invention, is shown. A monolithic switch, which is denoted generally as 20, contains service processing functions 22, call processing functions 24, facility processing functions 26 and a switch fabric 28. All of these functions 22, 24, 26 and 28 are hard-coded, intermixed and undifferentiated, as symbolized by the group 30. Moreover, functions 22, 24, 26 and 28 are designed by the switch manufacturer and operate on proprietary platforms that vary from manufacturer to manufacturer. As a result, these functions 22, 24, 26 and 28 cannot be modified without the aid of the manufacturer, which slows down service development and implementation, and increases the cost of bringing a new service to market. The development of new and innovative services, call processing, data processing, signal processing and network operations are, therefore, constrained by the manufacturer's control over their proprietary switch hardware and software, and the inherent difficulty of establishing and implementing industry standards.

The service processing functions 22 are encoded within the monolithic switch 20 and only allow local control of this process based on local data contents and the number dialed. This local information is interpreted by a hard-coded process engine that carries out the encoded service function. The call processing functions 24 are hard-coded and provide call origination and call termination functions. This process actually brings up and takes down individual connections to complete a call. Likewise, the facility processing functions 26 are also hard-coded and provide all data processing relating to the physical resources involved in a call. The switch fabric 28 represents the hardware component of the switch and the computer to run the monolithic software provided by the switch manufacturer, such as Northern Telecom, Inc. The switch fabric 28 provides the physical facilities necessary to establish a connection and may include, but is not limited to, bearer devices (T1's and DS0's), switching matrix devices (network planes and their processors), link layer signal processors (SS7, MTP, ISDN, LAPD) and specialized circuits (conference ports, audio tone detectors).

In an attempt to address the previously described problems, the International Telecommunications Union and the European Telecommunication Standards Institute endorsed the ITU-T Intelligent Network Standard ("IN"). Similarly, Bellcore endorsed the Advanced Intelligent Network Standard ("AIN"). Although these two standards differ in presentation and evolutionary state, they have almost identical objectives and basic concepts. Accordingly, these standards are viewed as a single network architecture in which the service processing functions 22 are separated from the switch.

Using the IN and AIN architectures, a network owner could presumably roll out a new service by creating and deploying a new Service Logic Program ("SLP"), which is essentially a table of Service Independent Building Blocks ("SIBB") to be invoked during a given type of call. According to this approach, a number of specific element types inter-operate in conjunction with a SLP to provide services to network subscribers. As a result, any new or potential services are limited by the existing SIBBS.

The In or AIN architecture, which is denoted generally as 40, logically separates the functions of the monolithic switch 20 into a Service Control Point ("SCP") 42, and a Service Switching Point ("SSP") and Switching System 44. The SCP 42 contains the service processing functions 22, whereas the SSP and Switching System 44 contain the call processing functions 24, facility processing functions 26 and the switch fabric 28. In this case, the call processing functions 24, facility processing functions 26 and the switch fabric 28 are hard-coded, intermixed and undifferentiated, as symbolized by the group 46.

The Service Switching Point ("SSP") is a functional module that resides at a switch in order to recognize when a subscriber's signaling requires more than simple routing based solely upon the number dialed. The SSP suspends further handling of the call while it initiates a query for correct handling of the call to the remote SCP 42, which essentially acts as a database server for a number of switches. This division of processing results in the offloading of the infrequent, yet time consuming task of handling special service calls, from the switch. Furthermore, this moderate centralization draws a balance between having one readily modifiable, heavy burdened repository serving the whole network versus deploying a complete copy of the repository at every switch.

Referring now to FIG. 2, a diagram of a telecommunications system employing an IN or AIN architecture is shown and is denoted generally as 50. Various customer systems, such as an ISDN terminal 52, a first telephone 54, and a second telephone 56 are connected to the SSP and Switching System 44. The ISDN terminal 52 is connected to the SSP and Switching System 44 by signaling line 58 and transport line 60. The first telephone 54 is connected to the SSP and Switching System 44 by transport line 62. The second telephone 56 is connected to a remote switching system 64 by transport line 66 and the remote switching system 64 is connected to the SSP and Switching System 44 by transport line 68.

As previously described in reference to FIG. 1, the SSP 70 is a functional module that resides at a switch in order to recognize when a subscriber's signaling requires more than simple routing based upon the number dialed. The SSP 70 suspends further handling of the call while it initiates a query for correct handling of the call. This query is sent in the form of SS7 messaging to a remote SCP 42. The Service Control Point 42 is so named because changing the database content at this location can alter the network function as it appears to subscribers connected through the many subtending switches. The query is sent through signaling line 72 to the Signal Transfer Point ("STP") 74, which is simply a router for SS7 messaging among these elements, and then through signaling line 76 to the SCP 42.

The Integrated Service Management System ("ISMS") 78 is envisioned as a management tool to deploy or alter services or to manage per-subscriber access to services. The ISMS 78 operates mainly by altering the operating logic and data stored within the SSP 70 and SCP 42. The ISMS 78 has various user interfaces 80 and 82. This ISMS 78 is connected to the SCP 42 by operations line 84, the SSP and Switching System 44 by operations line 86, and the Intelligent Peripheral ("IP") 88 by operations line 90. The Intelligent Peripheral 88 is a device used to add functions to the network that are not available on the switches, such as a voice response or speech recognition system. The IP 88 is connected to the SSP and Switching System 44 by signaling line 92 and transport line 94.

Now referring to FIG. 2, the processing of a call in accordance with the prior art will be described. The call is initiated when the customer picks up the receiver and begins dialing. The SSP 70 at the company switch monitors the dialing and recognizes the trigger sequence. The SSP 70 suspends further handling of the call until service logic can be consulted. The SSP 70 then composes a standard SS7 message and sends it through STP(s) 74 to the SCP 42. The SCP 42 receives and decodes the message and invokes the SLP. The SLI interprets the SCP, which may call for actuating other functions such as database lookup for number translation. The SCP 42 returns an SS7 message to the SSP and Switching System 44 regarding the handling of the call or otherwise dispatches messages to the network elements to carry out the correct service. At the conclusion of the call, an SS7 message is sent among the switches to tear down the call and call detail records are created by each switch involved in the call. The call detail records are collected, correlated, and resolved offline for each call to derive billing for toll calls thus, completing call processing.

The IN and AIN architectures attempt to predefine a standard set of functions to support all foreseeable services. These standard functions are all hard-coded into various state machines in the switch. Unfortunately, any new functions, which are likely to arise in conjunction with new technologies or unforeseen service needs, cannot be implemented without an extensive overhaul and testing of the network software across many vendor platforms. Furthermore, if a new function requires changes to standardized call models, protocols, or interfaces, the implementation of the service utilizing that function may be delayed until the changes are ratified by an industry standards group. But even as draft standards have attempted to broaden the set of IN and AIN supported functions, equipment suppliers have refused to endorse these draft standards due to the staggering increase in code complexity. A detailed flow chart describing the process for generic service creation according to the prior art may be found in above-mentioned, commonly-owned, co-pending U.S. patent application Ser. No. 09/128, 937 filed Aug. 5, 1998 (MCI D# RIC-97-110) entitled "Intelligent Call Platform for an Intelligent Network Distributed Architecture", the contents and disclosure of which is incorporated by reference as if fully set forth herein.

In further view of FIG. 2, other limitations of the IN and AIN architecture arise from having the call processing and facility processing functions, namely, the SSP 70, operating within the switch. As a result, these functions must be provided by each switch manufacturer using their proprietary software. Network owners are, therefore, still heavily dependent upon manufacturer software releases to support new functions. To further complicate the matter, the network owner cannot test SSP 70 modules in conjunction with other modules in a unified development and test environment. Moreover, there is no assurance that an SSP 70 intended for a switch manufacturer's processing environment will be compatible with the network owner's service creation environment.

This dependency of multiple network owners upon a common set of switch manufacturers results in two undesirable situations that limit competition. First, a manufacturer's software release may attempt to incorporate changes requested by several network owners, thus preventing the network owners from truly differentiating their services from the services provided by their competition. This also forces some network owners to wait until he manufacturer incorporates requests from other network owners into the new release. Second, a switch software release incorporating a function as requested by one network owner to implement a new service can unintentionally become accessible to other network owners. Therefore, despite the intentions of the IN and AIN architects, the network owner's creation, testing and deployment of new services is still impeded because the network owner does not have complete control of, or access to, the functional elements that shape network service behavior.

In another attempt to solve these problems, as disclosed in pending U.S. patent application Ser. No. 08/580,712, a Separate Switch Intelligence and Switch Fabric ("SSI/SF") architecture, which is referred to generally as 150 (FIG. 1), logically separates the SSP 70 from the Switching System 44. Now referring back to FIG. 1, the switch intelligence 152 contains the call processing functions 24 and facility processing functions 26 that are encoded in discrete state tables with corresponding hard-coded state machine engines, which is symbolized by circles 154 and 156. The interface between the switch fabric functions 158 and switch intelligence functions 152 may be extended through a communications network such that the switch fabric 158 and switch intelligence 152 may not necessarily be physically located together, by executed within the same processor, or even have a one-to-one correspondence. In turn, the switch intelligence 152 provides a consistent interface of simple non-service-specific, non-manufacturer-specific functions common to all switches.

An Intelligent Computing Complex ("ICC") 160, contains the service processing functions 22 and communicates with multiple switch intelligence elements 152. This approach offers the network owner advantages in flexible service implementation because all but the most elementary functions are moved outside the realm of the manufacturer-specific code. Further improvements may be realized by providing a more unified environment for the creation, development, test and execution of service logic.

As previously discussed, current network switches are based upon monolithic proprietary hardware and software. Although network switches can cost millions of dollars, such equipment is relatively slow in terms of processing speed when viewed in light of currently available computing technology. For example, these switches are based on Reduced-Instruction Set Computing ("RISC") processors running in the range of 60 MHz and communicate with each other using a data communications protocol, such as X.25, that typically supports a transmission rate of 9.6 Kb/s between various platforms in a switching network. This is extremely slow when compared to personal computers that contain processors running at 200 MHz or above and high end computer workstations that offer 150 Mb/s FDDI and ATM interfaces. Accordingly, network owners need to be able to use high-end workstations instead of proprietary hardware.

SUMMARY OF THE INVENTION

The present invention is directed to a novel system and method for managing communications service resources at nodes in an intelligent network designed to perform event processing services for any type of event, e.g., telephone call, received at a resource complex or switching platform associated with nodes of an Intelligent Distributed Network which is alternately referred to as the Next Generation Intelligent Network ("NGIN"). Particularly, the intelligent network includes a plurality of service nodes, each node providing an execution environment that may provide all of the call processing functionality necessary to handle a call at the instance it is received at the switch or resource complex physically associated with that particular service node. The network is of a highly scalable architecture and engineered to ensure that communications services, embodied as executable logic programs (objects) capable of invocation at each service node, are deployed and managed in a cost-effective manner.

The resource management system of the invention particularly is a hierarchical system that enables real-time optimization of service execution in a manner so as to increase efficiency and throughput of the intelligent network. Services, embodied as service logic programs (object and object instantiations) execute locally in one or more computing environments located at a service node, with each service and computing environment having an associated system load levels. As service objects are locally instantiated to perform call processing services upon receipt of service requests, e.g., a call received at the network switch, a first tier management component tracks system loads and service usage thresholds according to the business rules, e.g., time of day, expected call demand, etc. When a threshold is exceeded, a second tier management component associated with the service node, optimally determines whether an additional execution environment may be instantiated at that service node to perform the service at that node. A subset of the service status information maintained at each service of the network is provided to a third tier management system component associated with the intelligent network. Thus, when it is determined by the second tier management system that services may not available at a service node, the service may be instantiated at another execution environment provided at another service node, e.g., according to pre-defined business rules. In this manner, intelligent network resources are conserved, and service provision efficiency increased.

The various features of novelty which characterize the invention are pointed out with particularity in the claims annexed to and forming a part of the disclosure. For a better understanding of the invention, its operating advantages, and specific objects attained by its use, reference should be had to the drawings and descriptive matter in which there are illustrated and described preferred embodiments of the invention.

BRIEF DESCRIPTION OF THE DRAWINGS

The above and further advantages of the present invention may be better understood by referring to the following description in conjunction with the accompanying drawings, in which.

DETAILED DESCRIPTION

The present invention is one component of a comprehensive intelligent network alternately referred to herein as an Intelligent Distributed Network Architecture ("IDNA") or the Next Generation Intelligent Network ("NGIN"). As described herein, the NGIN architecture is designed to perform intelligent call processing services for any type of call received at a resource complex or switching platform, e.g., switch, router, IP termination address, etc. The IDNA/NGIN preferably comprises a plurality of distributed service nodes with each node providing an execution environment providing call processing functionality necessary to handle a call at the instance it is received at the switch or resource complex physically associated with that particular service node. NGIN is of a highly scalable architecture and engineered to ensure that executable service objects, embodied as independent Service Logic Programs ("SLP"), and associated data for performing event services, e.g., 1-800 telephone call, send fax, etc., may be deployed to and maintained at the service nodes in a cost-effective manner. By employing CORBA-compliant Object Request Broker technology, the intelligent network supports location and platform-independent call processing service execution independent of and transparent to the event switching platform or resource complex in which an event or call is received, and, enables high-level logic programs to be run virtually anywhere in the network independent of the service execution platform. Furthermore, the system provides location-independent communications among these distributed processes.

Figure 1:
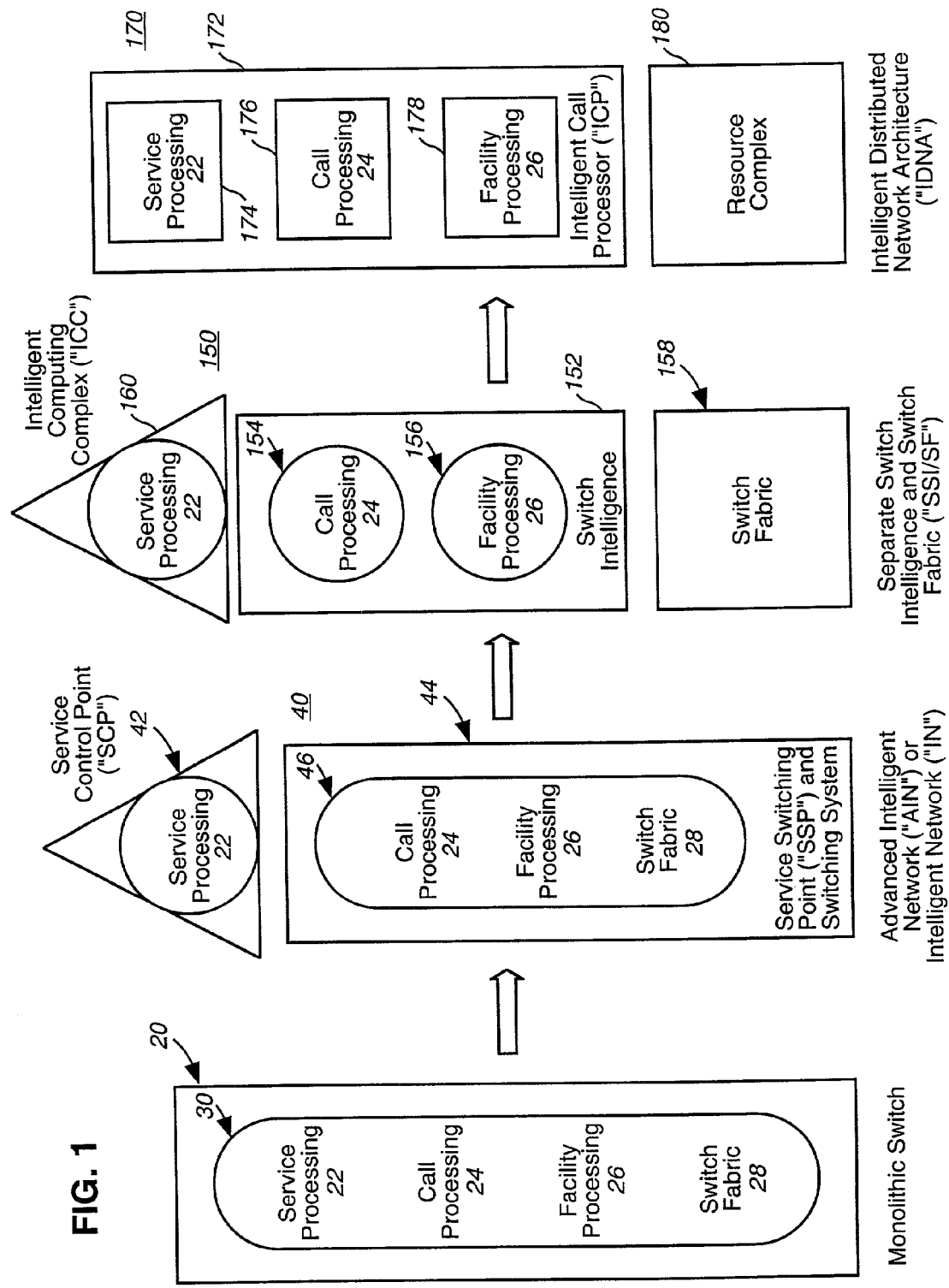
FIG. 1 is logical representation of various switching architectures.
Figure 2:
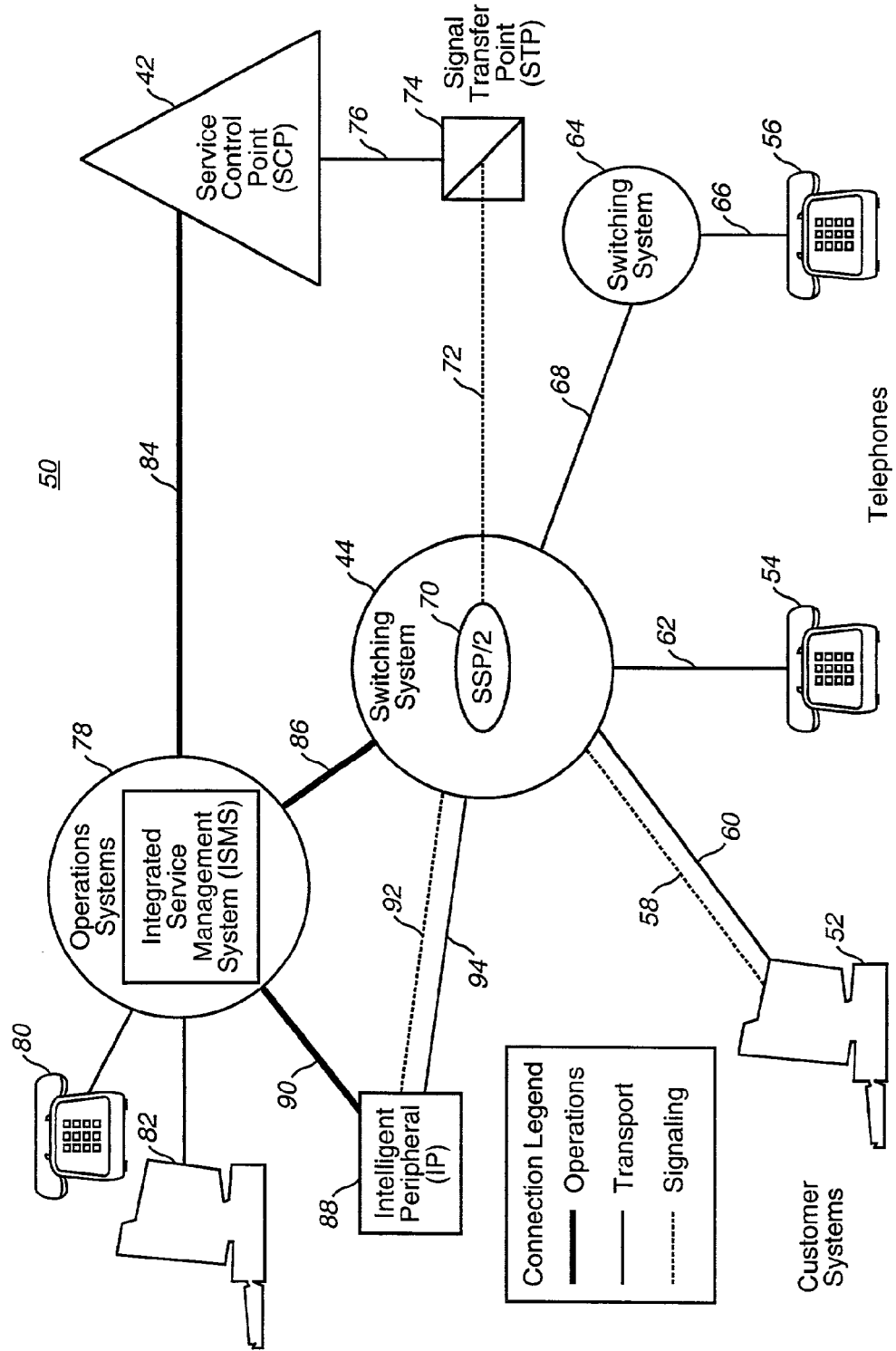
FIG. 2 is a diagram of a telecommunications system employing a typical intelligent network configuration according to the prior art.

Now referring to FIG. 1, the Intelligent Distributed Network Architecture ("IDNA") such as described in commonly assigned, co-pending U.S. patent application Ser. No. 09/128,937 filed Aug. 5, 1998 (MCI D# RIC-97-110) entitled "Intelligent Call Platform for an Intelligent Network Distributed Architecture", the contents and disclosure of which is incorporated by reference herein, is denoted generally as 170.

The present invention unifies the ICC 160 and Switch Intelligence 152 of the SSI/SF architecture 150 into an Intelligent Call Processor ("ICP") 172. Unlike the IN or AIN of SSI/SF architectures 40, whose functions are defined in state tables, the ICP 172 contains the service control functions 22, call processing functions 24 and facility processing functions 26 as managed objects in an object-oriented platform, which is symbolized by blocks 174, 176 and 178. The ICP 172 is logically separated from the Resource Complex 180.

Now referring to FIG. 3, a telecommunications system employing an intelligent distributed network architecture in accordance with the present invention will be described and is denoted generally as 200. The Wide Area Network ("WAN") 202 is a system that supports the distribution of applications and data across a wide geographic area. The transport network is based upon Synchronous Optical NETwork ("SONET") and connects the IDNA Nodes 204 and enables the applications within those nodes to communicate with each other.

Each IDNA Node 204 contains an Intelligent Call Processor ("ICP") 172 and a Resource Complex 180 (FIG. 1). FIG. 3 illustrates an IDNA Node 204 having a Resource Complex A ("RCA") 206 and a Resource Complex B ("RCB") 208. The ICP can be linked to Adjunct Processors 210, which provide existing support functions, such as provisioning, billing and restoration, however, these functions may be absorbed by functionality provided by a Network Management System ("NMS") 212. In the preferred embodiment, however, these support functions may be provided by a centralized Service Administration ("SA") system 500 having Data Management ("DM") component 400 as will be described herein with respect to FIG. 4. As further shown in FIG. 3, the ICP 172 can be also linked to other ICP's 172, other networks (not shown), or other devices (not shown) through a direct link 214 having signaling 216 and bearer links 218. A direct link prevents latency between the connected devices and allows the devices to communicate in their own language. The ICP 172 is the "brain" of the IDNA Node 204 and is preferably a general purpose computer, which may range from a single processor with a single memory storage device to a large scale computer network depending on the processing —requirements of the IDNA Node 204. Preferably, the general purpose computer will have redundant processing, memory storage and connections.

As used herein, general purpose computers refer to computers that are, or may be assembled with, commercial off-the-shelf components, as opposed to dedicated devices specifically configured and designed for telephone switching applications. The integration of general purpose computers within the calling network affords numerous advantages.

The use of general purpose computers gives the ICP 172 the capability of scaling up with additional hardware to meet increased processing needs. These additions include the ability to increase processing power, data storage, and communications bandwidth. These additions do not require the modification of manufacturer-specific software and/or hardware on each switch in the calling network. Consequently, new services and protocols may be implemented and installed on a global scale, without modification of individual devices in the switching network. By changing from monolithic switches 20 (FIG. 1) to intelligent call processors 172, the present invention provides the foregoing advantages and increased capabilities.

In the case of applications that require more processing power, multi-processing allows the use of less expensive processors to optimize the price/performance ratio for call processing. In other applications, it may be advantageous, necessary or more cost effective to use more powerful machines, such as minicomputers, with higher processing rates.

The ICP 172 may, as noted above, comprise a cluster of general purpose computers operating, for example, on a UNIX or Windows NT operating system. For example, in a large application, supporting up to 100,000 ports on a single Resource Complex, the ICP 172 may consist of sixteen (16) 32 bit processors operating at 333 MHz in a Symmetric Multi-Processor cluster. The processors could, for example, be divided into four separate-servers with four processors each. The individual processors would be connected with a System Area Network ("SAN") or other clustering technology. The processor cluster could share access to Redundant Array of Independent Disks ("RAID") modular data storage devices. Shared storage may be adjusted by adding or removing the modular disk storage devices. The servers in the clusters would preferably share redundant links to the RC 180 (FIG. 1).

As illustrated and like the "plug and play" feature of personal computers, the ICP software architecture is an open processing model that allows the interchangeability of: (1) management software; (2) ICP applications; (3) computing hardware and software; (4) resource complex components; and even (5) service architecture and processing. Such a generic architecture reduces maintenance costs due to standardization and provides the benefits derived from economies of scale.

Thus, the present invention enables the partitioning of development work and the use of modular tools that result in faster development and implementation of services. Moreover, the use of and the relevant aspects of service management are within the control of the network operator on an as required basis as opposed to the constraints imposed by fixed messaging protocol or a particular combination of hardware and software supplied by a given manufacturer.

Through the use of managed objected, the present invention also allows services and functions to be flexibly ("where you want it") and dynamically ("on the fly") distributed across the network based on any number of factors, such as capacity and usage. Performance is improved because service processing 22 (FIG. 1), call processing 24 (FIG. 1) and facility processing 26 (FIG. 1) operate in a homogeneous platform. In addition, the present invention allows the monitoring and manipulation of call sub-elements that could not be accessed before. The present invention also provides for monitoring the usage of functions or services so that when they are outdated or unused they can be eliminated.

The Resource Complex ("RC") 180 (FIG. 1) is a collection of physical devices, or resources, that provide bearer, signaling and connection services. The RC 180, which can include Intelligent Peripherals 88, replaces the switch fabric 28 and 158 (FIG. 1) of the IN or AIN or SSI/SF architecture. Unlike the IN or AIN architecture, the control of the Resource Complex, such as RCA 206 is at a lower level.

Moreover, the RCA 206 can contain more than one switch fabric 158. The switch fabrics 158 or other customer interfaces (not shown) connect to multiple subscribers and switching networks via standard telephony connections. These customer systems may include ISDN terminals 52, fax machines 220, telephones 54, and PBX systems 222. The ICP 172 controls and communicates with the RC 180 (FIG. 1), RCA 206 and RCB 208 through a high speed data communications pipe (minimally 100 Mb/sec Ethernet connection) 224. The RC 180, 206 and 208 can be analogized to a printer and ICP 172 can be analogized to a personal computer wherein the personal computer uses a driver to control the printer. The "driver" in the IDNA Node 204 is a Resource Complex Proxy ("RCP") (not shown), which will be described below in reference to FIG. 6. This allows manufacturers to provide an IDNA compliant node using this interface without having to rewrite all of their software to incorporate IDNA models.

In addition, the control of the Resource Complex 180 (FIG. 1), RCA 206 and RCB 208, is at a lower level than typically provided by the AIN or IN architecture. As a result, resource complex manufacturers only have to provide a single interface to support facility and network management processing; they do not have to provide the network owner with specific call and service processing. A low level interface is abstracted into more discrete operations. Having a single interface allows the network owner to choose from a wide spectrum of Resource Complex manufacturers, basing decisions on price and performance. Intelligence is added to the ICP 172 rather than the RC 180, which isolates the RC 180 from changes and reduces its complexity. Since the role of the RC 180 is simplified, changes are more easily made, thus making it easier to migrate to alternative switching and transmission technologies, such as Asynchronous Transfer Mode ("ATM").

Intelligent Peripherals ("IP") 88 provide the ability to process and act on information contained within the actual call transmission path. IP's 88 are generally in a separate Resource Complex, such as RCB 208, and are controlled by the ICP's 172 in a similar manner as RCA 206. IP's can provide the ability to process data in the actual call transmission path in real-time using Digital Signal Processing ("DSP") technology.

The Network Management System ("NMS") 212 is used to monitor and control hardware and services in the IDNA Network 200. A suggested NMS 212 implementation might be a Telecommunications Management Network ("TMN") compliant framework which provides management of the components within the IDNA Network 200. More specifically, the NMS 212 controls the deployment of services, maintains the health of those services, provides information about those services, and provides a network-level management function for the IDNA Network 200. The NMS 212 accesses and controls the services and hardware through agent functionality within the IDNA nodes 204. The ICP-NMS Agent (not shown) within the IDNA Node 204 carries out the commands or requests issued by the NMS 212. The NMS 212 can directly monitor and control RCA 206 and RCB 208 through a standard operations link 226.

Figure 3:
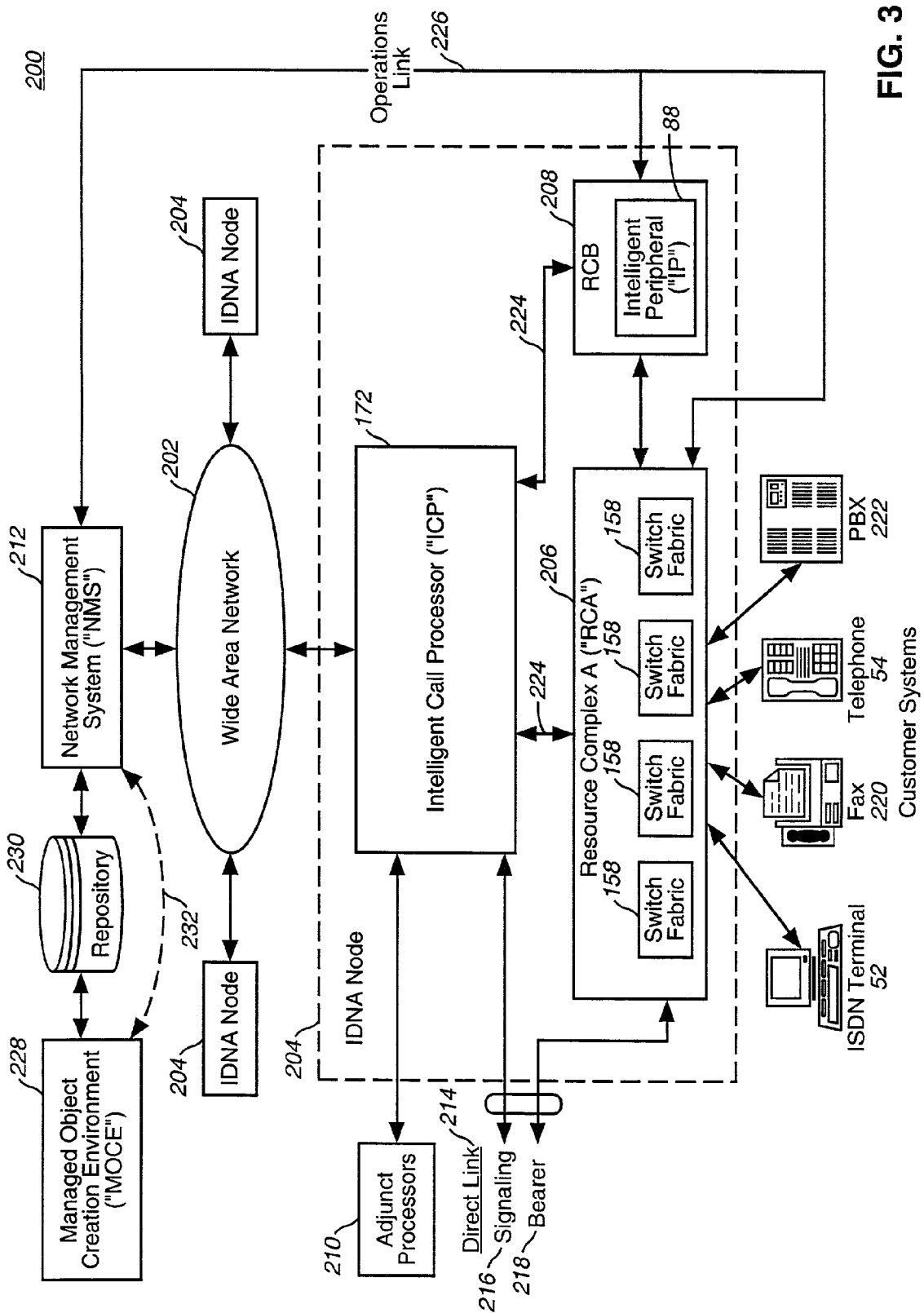
FIG. 3 is a diagram of a telecommunications system employing an intelligent distributed network architecture.

As further shown in FIG. 3, the Managed Object Creation Environment ("MOCE") 228 includes the sub-components to create services that run in the IDNA network 200. A Service Independent Building Block and API representations that a service designer uses to create new services are imbedded within the MOCE'S primary sub-component, a Graphical User Interface ("GUI"). The MOCE 228 is a unified collection of tools hosted on a single user environment or platform, alternately referred to as a Service Creation ("SC") environment. It represents the collection of operations that are required throughout the process of service creation, such as service documentation, managed object definition, interface definition, protocol definition and data input definition, which are encapsulated in managed objects, and service testing. The network owner only has to develop a service once using the MOCE 228, because managed objects can be applied to all the nodes on his network. This is in contrast to the network owner having each of the various switch manufacturers develop their version of the service, which means that the service must be developed multiple times.

The MOCE 228 and NMS 212 are connected together via a Repository 230. The Repository 230 contains the managed objects that are distributed by the NMS 212 and used in the IDNA/NGIN Nodes 204. The Repository 230 also provides a buffer between the MOCE 228 and the NMS 212, The MOCE 228 may, however, be directly connected to the NMS 212 to perform "live" network testing, which is indicated by the dashed line 232.

Figure 4:
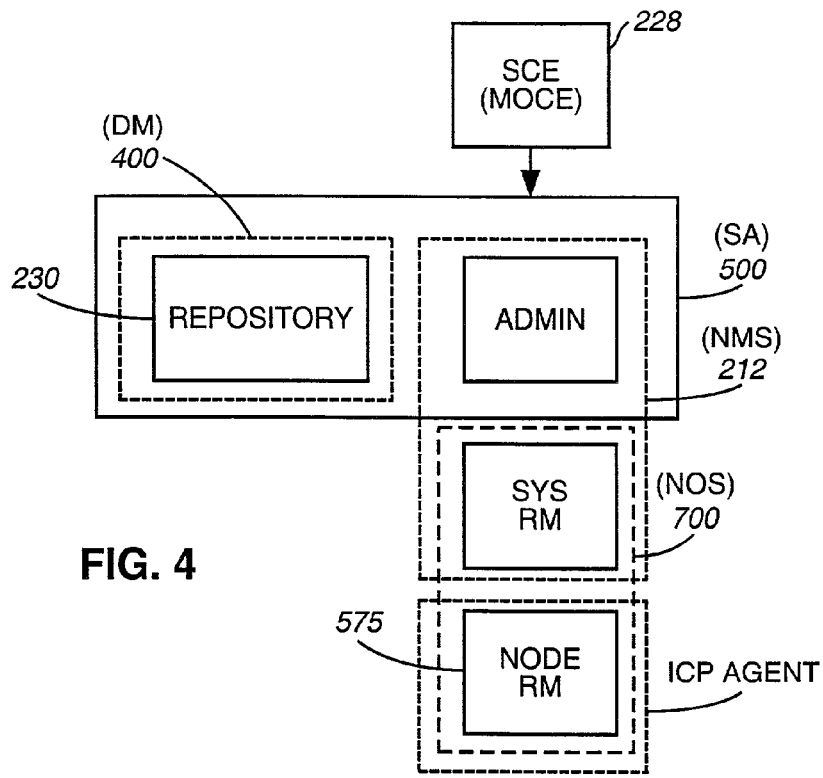
FIG. 4 is a block diagram depicting an alternative embodiment of IDNA functional components configured as the Next Generation Intelligent Network.

In accordance with the preferred embodiment of the invention, as shown in FIG. 4, the IDNA/NGIN system includes a centralized Service Administration ("SA") component 500 that provides both a storage (Repository) 230 functionality and the generic network management (NMS) 212 functionality of the IDNA system 170 together with added capabilities as described in greater detail in commonly-owned, co-pending U.S. patent application Ser. No. 09/421,590 (D#11337, COS-98-021) entitled METHOD AND APPARATUS FOR DEPLOYING SERVICE MODULES AMONG SERVICE NODES DISTRIBUTED IN AN INTELLIGENT NETWORK, the contents and disclosure of which is incorporated by reference as if fully set forth herein. Generally, the SA component 500 as shown in FIG. 4, supports off-line storage, naming, distribution, activation and removal of all services and data for the IDNA/NGIN system and, additionally provides a data management ("DM") function enabling the run-time storage, replication, synchronization, and availability of data used by the service objects in the IDNA service nodes.

Figure 5:
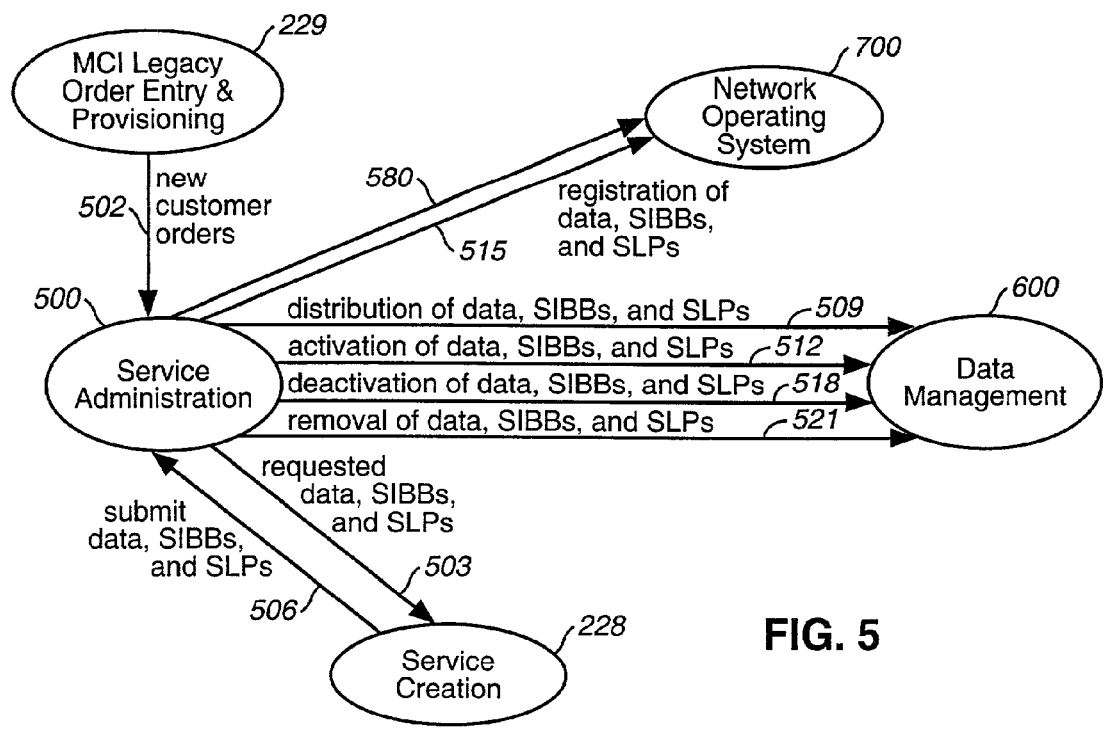
FIG. 5 illustrates conceptually the functionality of the service administration component 500.

More particularly, as shown conceptually in FIG. 5, the Service Administration component 500 is a component that performs all of the functions needed to manage, store, and distribute all services and service data used by IDNA/NGIN service processing nodes and to configure both the hardware and software components implemented in the IDNA/NGIN system. Generally, as shown in FIG. 5, the SA component 500 is responsible for: receiving the data from MOCE (Service Creation) 228, receiving customer order data 502 from order entry and other legacy systems 229 to provision the IDNA/NGIN system for use by customers; deploying data, Service Independent Building Blocks ("SIBBs"), Service Logic Programs ("SLPs"), and other service components 503, e.g., to the MOCE 200 as requested by MOCE/SCE users, for example, during the service creation process; receiving completed and tested service packages, SIBBs, SLPs or other service or data components 506 from MOCE 228; providing unique names to each service component; and, distributing the data and each service component 509 to a Data Management functional component 400, to be described in greater detail herein. In addition, as shown in FIG. 4, Service Administration 300 maintains the repository 230 which includes a global Database of Record ("DBOR") comprising all IDNA services and data from which the Data Management component 400 receives all of its data.

Referring back to FIG. 5, other responsibilities of Service Administration include: activating data and service components 512 to ensure that all data, SIBBs and managed objects or service logic programs SLPs are available for nodes via the Data Management component 400; registering the names of the data, SLPs and SIBBs 515 by feeding their logical names to a Network Operating System ("NOS") component 700, to be described in detail below, for registration therewith; deactivating data and service components 518; and, removing data and services 521 from the IDNA/NGIN system via the Data Management component 400. Service Administration additionally performs a configuration management function by maintaining the state of each SIBB and service (pre-tested, post-tested, deployed, etc.), in addition to versioning through its naming process. This ensures a service is not deployed until all components of that service have been successfully tested and configured.

As described in above-referenced co-pending U.S. Patent Application No. PCT/US99/24578, the Service Administration component 500 further performs the function of configuring and provisioning the IDNA/NGIN service nodes 204 in accordance with configuration information that SA receives. Particularly, based on the received configuration information, the SA component 500 determines the capabilities of each component at each service node 204, which services and data to distribute to which nodes, which services will run on which server(s) resident at the service node, and which data will be cached to local memory resident associated with IDNA/NGIN node server(s). Particularly, SA deploys configuration rules contained in service profile (configuration) files 580 to a Local (node) Resource Manager ("LRM") component 575 of the NOS system 700 for storage in a local LRM cache located at each service node. As will be described in greater detail herein, these configuration files 580 determine which services to execute at an IDNA node. The LRM first reads this service profile file 580 stored in the local cache at that node, and determines a specific Service Layer Execution Environment ("SLEE"), e.g., a virtual machine, to run a service on in accordance with the rules in the service profile file and, which services are to run actively (as persistent objects) in the SLEE, or are to be instantiated only on-demand.

Figure 6:
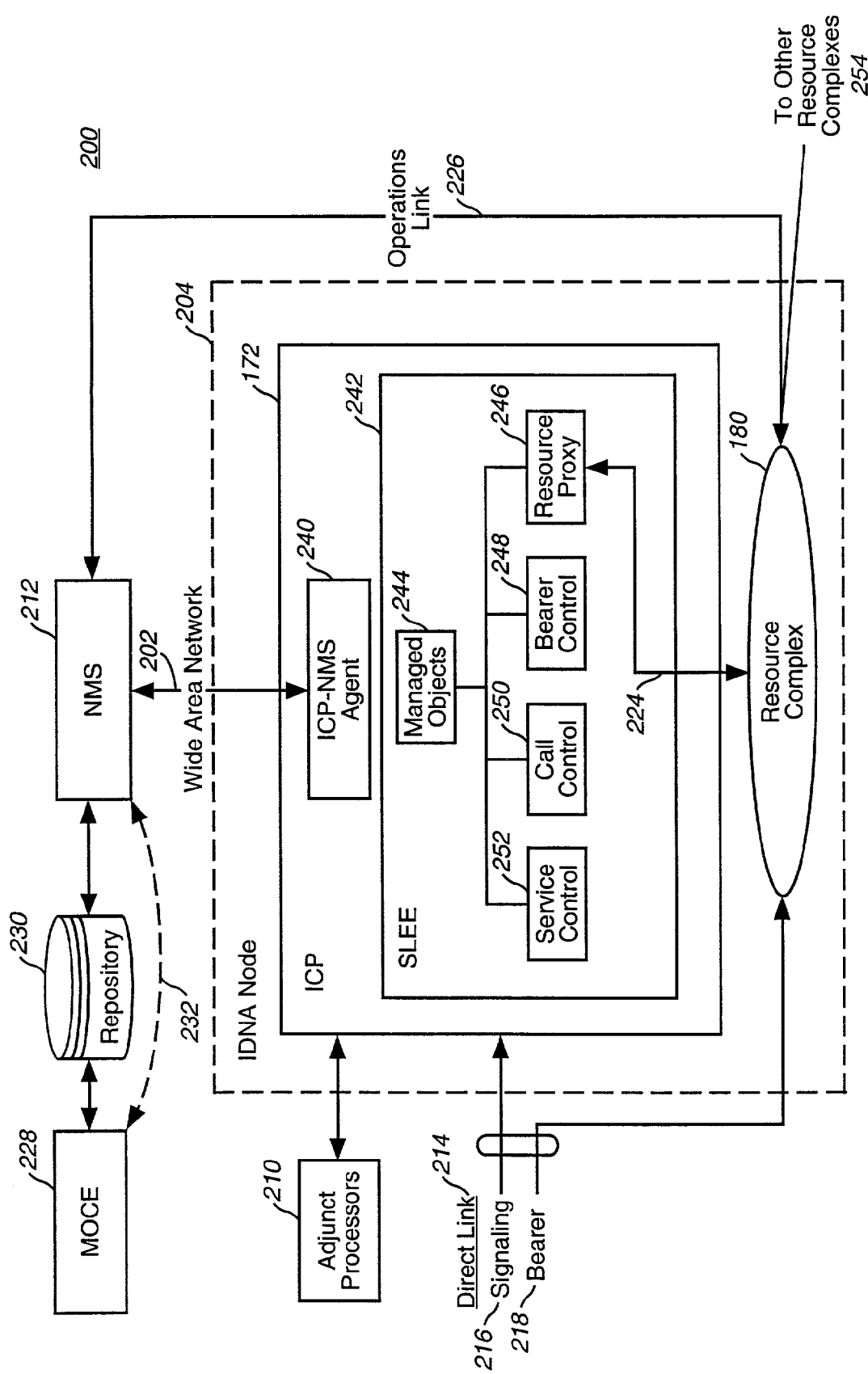
FIG. 6 is a logical and functional diagram of a telecommunications system employing an intelligent distributed network architecture in accordance with the present invention.

Referring now to FIG. 6, a logical and functional diagram of a telecommunications system employing an intelligent distributed network architecture 200 in accordance with the present invention will be described. The ICP 172 is shown to contain an ICP-NMS Agent 240 and a SLEE 242 that, in turn, hosts a variety of managed objects 246, 248, 250 and 252 derived from the managed objects base class 244. The ICP-NMS Agent 240 provides the NMS 212 the ability to control the operation of the ICP 172, and, as will be described, the ability to control the operation and configuration of the LOS 260, the operation and configuration of the WANOS 262, and the instantiation and operation of SLEE(s) 242.

In general, managed objects are a method of packaging software functions wherein each managed object offers both functional and management interfaces to implement the functions of the managed object. The management interface controls access to who and what can access the managed object functions. In the present invention, all of the telephony application software, except for the infrastructure software, run by the IDNA/NGIN Node 204 is deployed as managed objects and supporting libraries. This provides a uniform interface and implementation to control and manage the IDNA Node software.

The collection of network elements that connect, route, and terminate bearer traffic handled by the node will be collectively referred to as the Resource Complex ("RC") 180. The service processing applications running on the SLEE use the Resource Proxy ("RCP") 244 as a control interface to the RC 180. The RCP 244 may be likened to a device driver in that it adapts equipment-independent commands from objects in the SLEE to equipment-specific commands to be performed by the RC 180. The RCP 224 can be described as an interface implementing the basic commands common among vendors of the resources in the RCP 244. The RCP 244 could be implemented as shown as one or more managed objects running on the IDNA node 204. Alternatively, this function could be provided as part of the RC 180. The NMS 212, Repository 230 and MOCE 228 are consistent with the description of those elements in the discussion of FIGS. 3–5.

Note that the operations link 226 directly connects the NMS 212 to the RC 180. This corresponds to the more traditional role of a network management system in monitoring the operational status of the network hardware. This can be done independently of the IDNA architecture (e.g., by using the well-known TMN approach). In addition, the RC 180 may be connected to other resource complexes 254. A direct signaling link 214 is also shown entering the ICP 172 so that signaling 216, such as SS7, can enter the call processing environment directly. By intercepting signaling at the network periphery, the SS7 message can go directly to the ICP 172 without going through the RC 180. This reduces latency and improves robustness by shortening the signaling path. An accompanying bearer line 218 connects to the RC 180.

Figure 7:
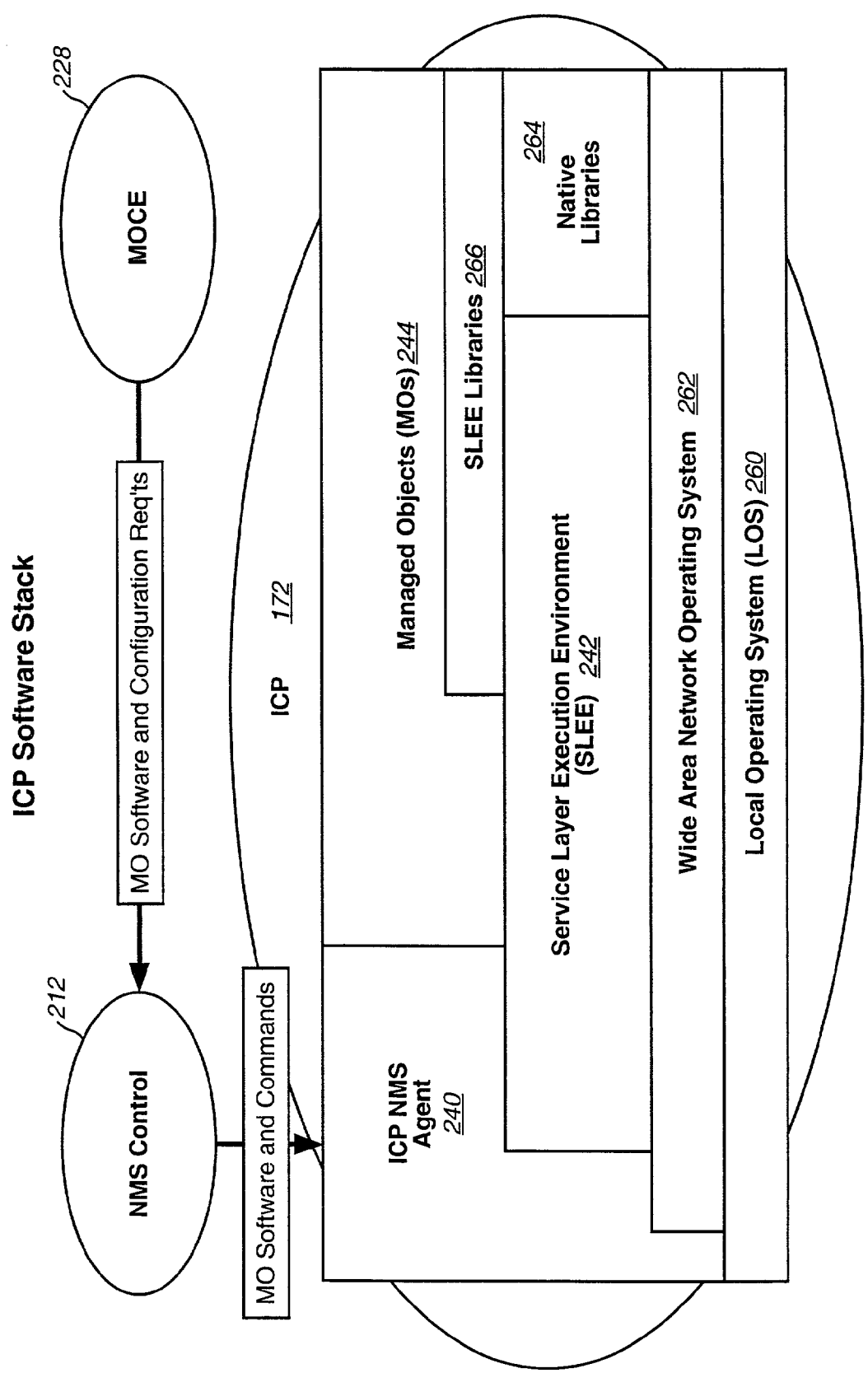
FIG. 7 is a diagram illustrating the layering of functional interfaces within an intelligent call processor in accordance with the present invention.

FIG. 7 depicts the layering of functional interfaces within the ICP 172. The MOCE 228 is the system where the managed object software and its dependencies are generated. The NMS 212 controls the execution of the ICP 172 by interfacing to an agent function provided within the ICP 172, called the ICP-NMS Agent 240. The NMS 212 controls the operation of the Local operating System ("LOS") 260 on the ICP 172. The NMS 212 controls the operation of the ICP 172, including starting and stopping of processes, querying the contents of the process table, and the status of processes, configuring the operating system parameters, and monitoring the performance of the general purpose computer system that hosts the ICP 172.

The NMS 212 also controls the operation of the Wide Area Network Operating System ("WANOS" ) 262. The NMS 212 controls the initialization and operation of the WANOS support processes and the configuration of the WANOS libraries via its control of the LOS 260 and any other interfaces provided by the NMS SLEE control. The NMS 212 controls the instantiation and operation of the one or more SLEE's 242 running on an ICP 172. The LOS 260 is a commercial-off-the-shelf operating system for operation of the general purpose computer. The WANOS 262 is a commercial-off-the-shelf middle-ware software package (e.g., an object request broker) that facilitates seamless communication between computing nodes. The SLEE 242 hosts the execution of managed objects 244, which are software instances that implement the service processing architecture. The SLEE 242 implements the means to control the execution of the managed objects 244 by the ICP-NMS Agent 240. Thus, a SLEE 242 instance is a software process capable of deploying and removing managed object software, instantiating and destroying managed object instances, supporting the interaction and collaboration of managed objects, administering access to Native Libraries 264, and interfacing with the NMS-ICP Agent 240 in implementing the required controls.

The Native Libraries 264 are libraries that are coded to depend only on the LOS 260 or WANOS 262 and the native general purpose computer execution (e.g., compiled C libraries). They are used primarily to supplement the native functionality provided by the SLEE 242.

SLEE libraries 266 are libraries coded to execute in the SLEE 242. They can access the functions provided by the SLEE 242 and the Native Libraries 264. The managed objects 244 are the software loaded and executed by the SLEE 242. They can access the functionality provided by the SLEE 242 and the SLEE libraries 266 (and possibly the native libraries 264).

The ICP-NMS Agent 240 provides the NMS 212 the ability to control the operation of the ICP 172. The ICP-NMS Agent 240 implements the ability to control the operation and configuration of the LOS 260, the operation and configuration of the WANOS 262, and the instantiation and operation of SLEE(s) 242. The proposed service processing architecture operates in layers of increasing abstraction. From the perspective of the SLEE 242, however, there are only two layers: the managed object layer 244, which is the layer of objects (software instances) that are interaction under the control of the NMS 212; and the Library layer 264 or 266, which is the layer of software (either native to the SLEE 242 or the LOS 260) that supplies supplementary functions to the operation of the managed objects 242 or the SLEE 242 itself.

It should be understood that, collectively, the NMS, LOS, WANOS and ICP-NMS Agent functionality, described with respect to FIGS. 3 and 7, may be represented as a Network Operating System or "NOS" 700 for providing platform independent and location independent connectivity between the IDNA/NGIN system components. That is, NOS comprises a set of network-wide services that provides process interfaces and communications among the other IDNA/NGIN functional components and sub-components. Among the services provided by NOS are object connectivity, logical name translation, inter-process communications, and local and system-wide resource management ("RM"). According to the preferred embodiments, as shown in FIG. 3, the NOS component 700 provides local (NODE RM or LRM) and system-wide resource management (SYS RM or NRS) functions, as described herein. Particularly, the NOS component encapsulates the location of any service from the processes that need services and data, so that a process only needs to make a call to a single logical name. The NOS component then determines which instance of a service to use, and provides connectivity to that instance. The NOS 700 enables, in part, both the widely distributed nature of IDNA/NGIN, and the platform-independence of IDNA/NGIN. For example, the aforementioned logic programs use the NOS component 700 to call other logic programs, and can therefore call and invoke other logic programs that run on different SLEEs either in the same service node or a remote service node. Particularly, through the SA 500, a service node may be specified to perform only certain services. When a call that arrives at a switch having an associated service node 204 for which the needed service may not be performed, e.g., joining a conference bridge, IDNA may need to route the call to another node configured to provide such service. Preferably, IDNA/NGIN, via the NOS component 700, will call the needed service at another remote service node, perform the call processing, and provide a service response to the switch at the original node.

FIG. 8(*a*) illustrates particularly a preferred architecture of a service control environment 430 having SLEE applications 450, 450' executing within the operating system 435 of a service control server, e.g., general purpose computer 440. As shown in FIG. 8(*a*), the SLEE 450 is designed to execute at least five types of logic programs implemented in performing call processing services and other supporting services: 1) Feature Discriminator logic programs ("FD") 510, which are functional sub-components (objects) that first receive a service request from the switching platform, determine which service to perform on a call based on some available criteria, for example, the dialed number of the call, and, then calls on another appropriate Service Logic Program to process the call; 2) the Service Logic Program ("SLP") objects 520, which are functional sub-components that perform service processing for a received service request or event; 3) Line Logic Program ("LLP") objects 530, which are functional sub-components that maintain the current state of a network access line; 4) Event Logic Program ("ELP") objects 540, to which all other logic programs write events; and 5) Call Logic Program ("CLP") objects 545 which are functional sub-components that maintains the state of an entire call by providing a connection point for all other logic programs that are involved in the processing of a call. Each of these logic programs are embodied as a software "objects", preferably written in Java™ programming language, that may either be temporarily instantiated or persistent, as will be described. The IDNA/NGIN service control architecture is designed such that these objects are written only once in MOCE/SCE, and may be deployed to a SLEEs on any type of computer and on any type of operating system anywhere in the network.

As shown in FIG. 8(*a*), other processes that execute within the SLEE 450 for support and operational functions include: a Service Manager ("SM") object 554, responsible for loading, activating, de-activating and removing services that run in the SLEE and, further monitoring all other services running within its SLEE, and reporting status and utilization data to NOS; a NOS client process 558 which is a NOS class library that is used for interfacing with NOS services and is used by all services running within that SLEE to call on NOS services, i.e., is the gateway to NOS; a thread manager (TM) 557, which provides functionality needed for NGIN services to execute concurrently without tying up all the SLEE resources; and, a Data Management API 410 used to interface with the local cache and cache manager components of DM 400 through the intermediary of the DMAPI 410. As an example, a 1-800-number service having a SIBB that has collected 1-800-number digits, for example, may need to interact with the data management component to query a database to perform a number translation. This is accomplished through the DM API 410 which will perform the translation look-up and provide the data back to the service. As described herein, the database may have been previously loaded to the local cache 415 or, the data is accessed from the local DBOR through the DM server 425.

When a SLEE is first started (typically as part of system boot), it starts its locator service and instantiates within its environment the service manager process 554. The service manager process 554 particularly implements an ORB interface to enable service management functionality with operations including: loading, starting, running and stopping services within the SLEE. Preferably, it is the first process that registers itself with NOS, and once registered with NOS, any request for a service may be processed. Particularly, NOS sends a message to the Service Manager process 554 to start (or stop) a particular service and the Service Manager 554, in response, respectively instantiates or kills the selected service object.

Further to the SLEE start-up process, NOS 700 determines which other service objects need to be instantiated based on the configuration file 580 generated by SA 500 (FIG. 3), downloads them from the data management component into the memory, and instantiates them. Each of these instantiated objects registers themselves with the NOS locator service, i.e., LRM 577, in accordance with a naming convention, generally exemplified by the following string:

. . . site level. SLEE Number. SLP name . . .

where the site level is the information pertaining to the physical location of the IDNA/NGIN service control server 440; the SLEE Number is the particular SLEE in which that object has been instantiated, e.g., SLEE#1; and the SLP name is the logical name of the service, e.g., Feature Discriminator. The string may include a "version number". This registration name is propagated to other locator sites in the NGIN domain; and it is by this registration process and the resource management system of the invention by which the NOS component knows which processes have been deployed, where they have been deployed, and where services may be currently available.

The NOS component 700 is provided with a NOS master component 560 that interfaces directly with the computer's operating system and the NOS client process 558. Preferably, there is a NOS master process 560 located on the network or the local node that interfaces with the NOS client object 558 on each SLEE and includes all NOS class libraries for providing NOS services. As will be explained in greater detail, when a particular executing service needs to call on another service, it invokes NOS's LRM 577 via the NOS client object 558 and the NOS name translator function 570 (FIG. 8(*b*)) to locate and select an instance of the called service.

As further shown in FIG. 8(*a*), each service instance loaded in the SLEE has a service agent instance 559 and a thread manager instance 557 associated therewith. As part of the service activation, whenever a request is made for a service, e.g., in response to a call event, that requested service's service agent instance 559 will get the location of the call from NOS, via the NOS agent, and will query its thread manager instance 557 to determine if there is another thread instance that could process that call.

Specifically, the service agent instance provides instantiation of a thread manager ("TM") object associated with the service agent and depicted as TM object instance 557 in FIG. 8(*a*). As will be described, the thread manager object is based on a (ThreadManager) class which may be instantiated to behave like a thread factory functioning to create a new SLEE thread per service request, or a thread warehouse, which is desired when running on machines with high thread creation latencies. Next, the SA associated with the service enters into a process event loop via its (run) class method, and is now ready for receiving call events associated with a service.

Figure 8A:
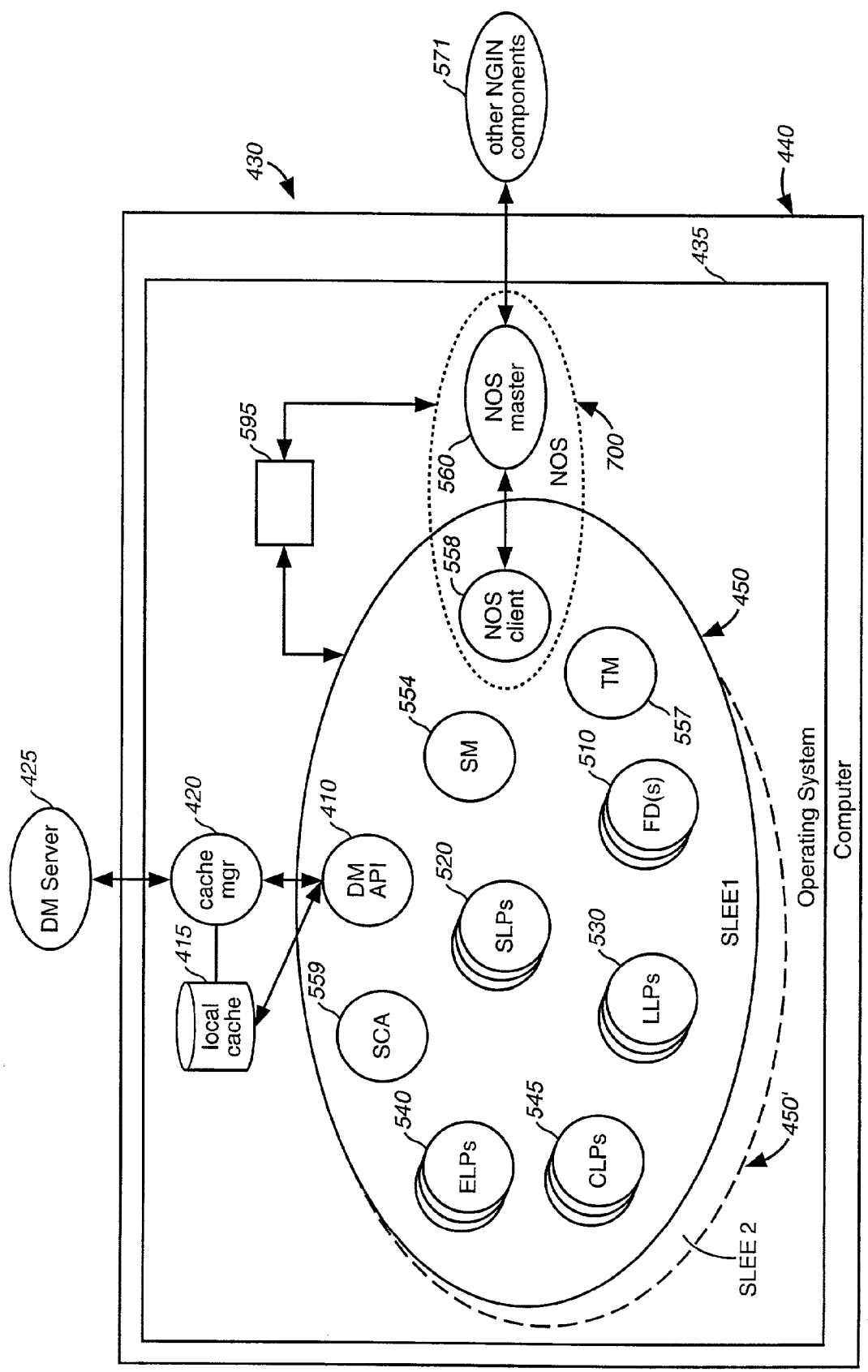
FIG. 8(a) illustrates a preferred architecture of a service control environment 430.
Figure 8B:
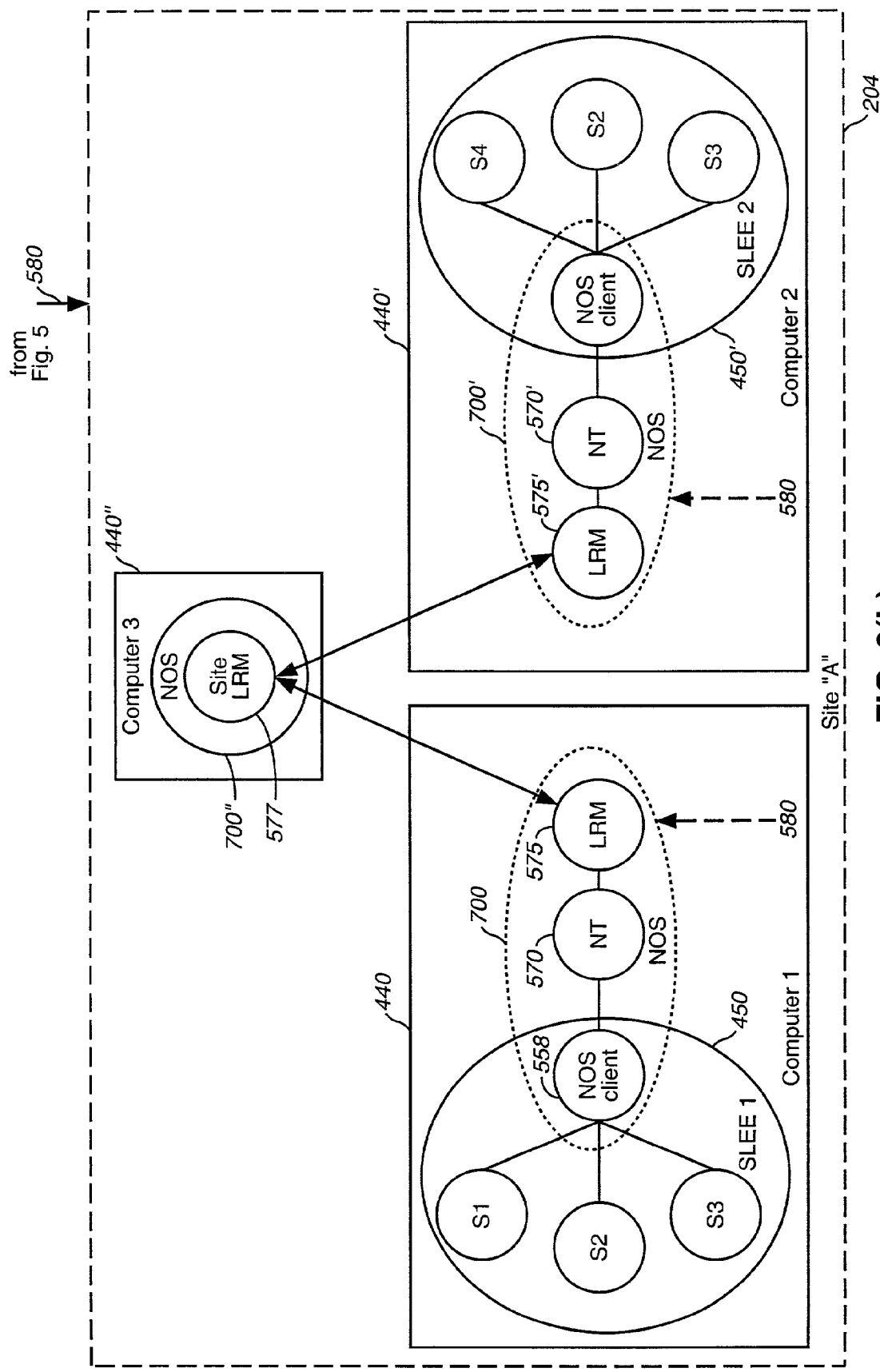
FIG. 8(b) illustrates the functional architecture of the NOS NT and LRM functional sub-components.
Figure 8C:
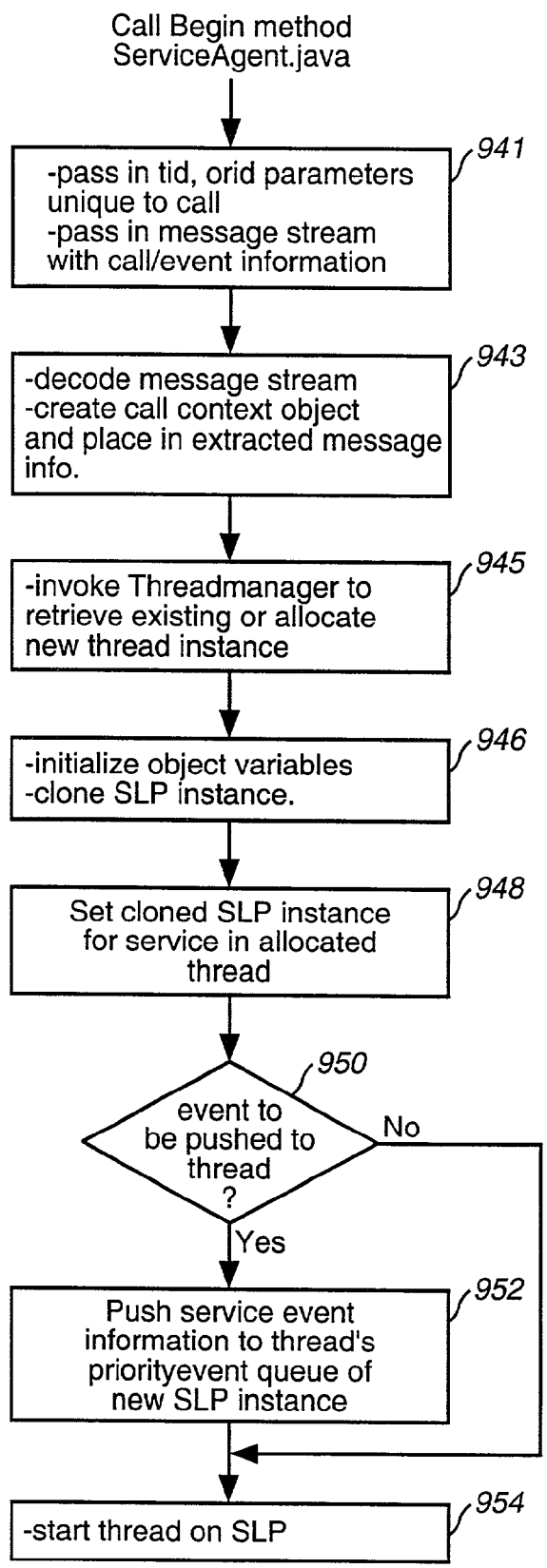
FIG. 8(c) is a flow chart depicting the Service Agent functionality.

Referring to FIG. 8(c), there is illustrated the details of the ServiceAgent ("Sag") class which provides the gateway into the NGIN services via its (begin), (continue) and (end) class methods. Every service within the SLEE has an associated ServiceAgent object which is based on a class responsible for managing service instances (call instances) and dispatching events to service instances. As shown in FIG. 8(c), after a SAg object is instantiated by a Service Manager (load) method and is running, the SAg's (begin) method is invoked each time a new call requesting that service is received. Particularly, as indicated in FIG. 8(c), at step 941, tid, orid call identifier parameters and a message stream containing event information related to service processing for that call, e.g., as provided by an Initial Address Message ("IAM") from the switch fabric or resource complex, is first passed into the SAg begin method. Then, at step 943, the message stream is decoded, e.g., by invoking a (decode) method to extract the critical information related to that service instance. Additionally, a call context object instance used for managing call context data is created to receive the extracted message information. During service processing, all call context data relating to each service instance, is managed by the thread and tracked for future use. Next, in the begin method at step 945, a new thread is allocated for that call by invoking the allocate method of the ThreadManager instance, or, a thread is pulled from a pool of threads if several threads for that service have been instantiated ahead of time. Otherwise, if the SAg (continue) method is invoked, an object reference corresponding to the allocated thread for that call is returned.

Figure 8D:
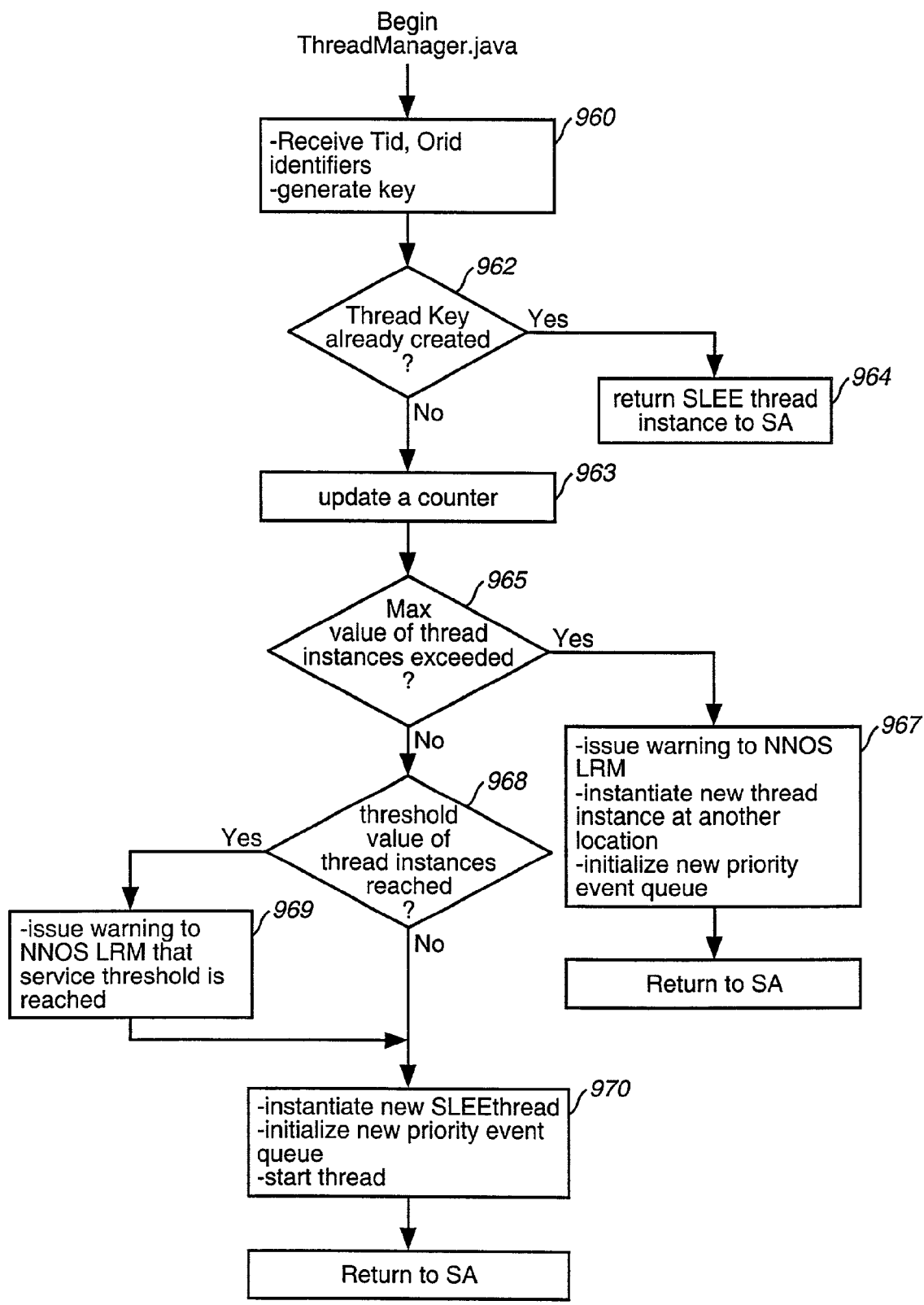
FIG. 8(d) is a flow chart depicting the Thread Manager process.
Figure 9:
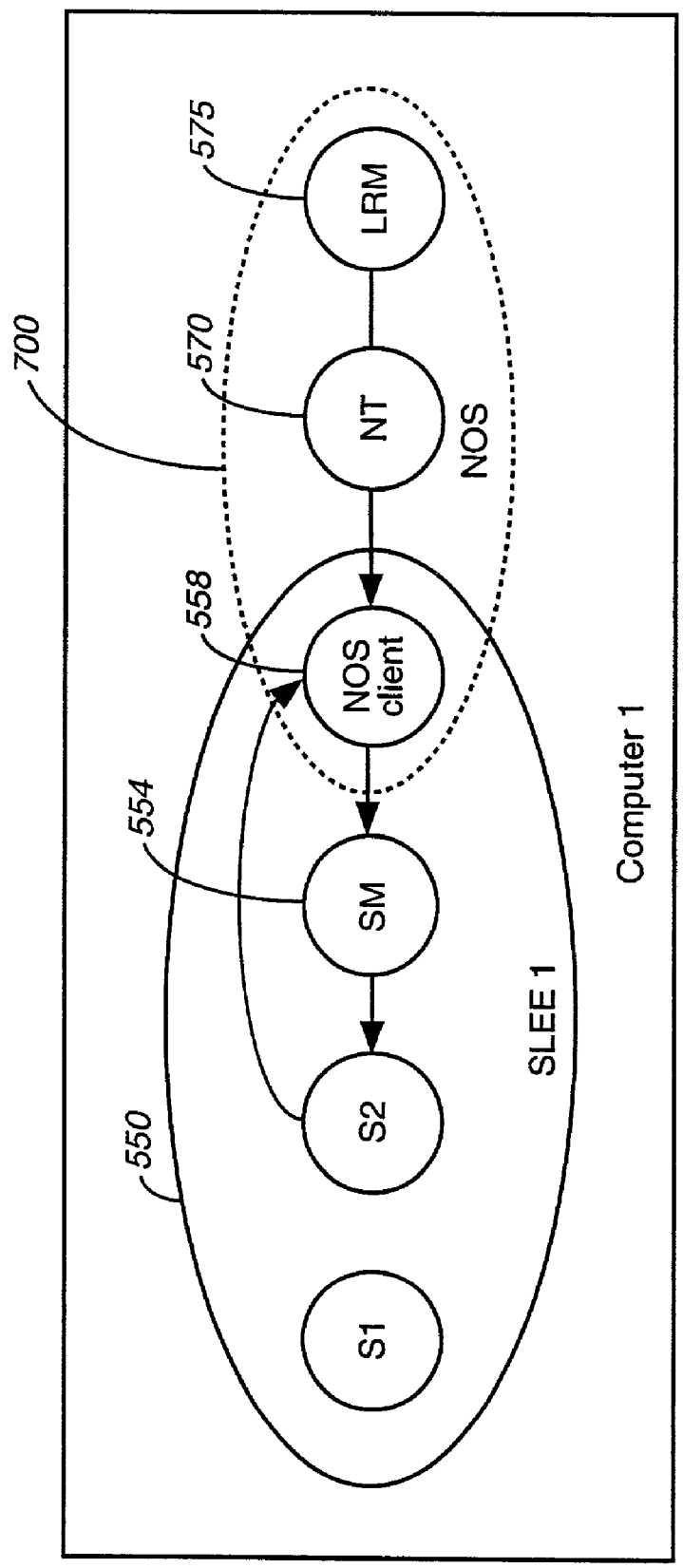
FIG. 9 illustrates the activation of a service via the NOS LRM component.

With greater particularly, the thread manager object is based on the ThreadManager class which preferably manages threads based on session ids. Two methods, (allocate) and (release) are provided for allocating and releasing threads, respectively. Both allocate and release expect a unique identifier as a key that can be used for thread identification. The unique identifiers include a transaction ID ("Tid") which is set by the NGS switch which received the call, and an object reference ID ("Orid") identifying the call originator and are used to identify a call instance. FIG. 8(d) illustrates the operational details of the (allocate) method of the thread manager class. As shown in FIG. 8(d), at step 960, the Tid and orid identifiers for uniquely identifying the call transaction are passed in the process and a unique key is generated based on the identifiers. Then, at step 962, a query is made as to whether the key identifies an already existing thread, for example, by checking a hashtable of key-value pairs. If the key is recognized meaning that a service thread has already been allocated for the call, then at step 964, the thread manager will return the SleeThread instance (thread object) after consulting the hashtable. Otherwise, at step 963 a counter which tracks number of instantiated service threads is incremented, and in an effort to monitor system loads, at step 965, a determination is made as to whether the maximum value of thread instances for that service has exceeded. If the maximum value of thread instances for that service has been exceeded, e.g., upon comparison of the counter value with the maximum service instance value found in the service configuration file, then at step 967 a message is issued to NOS to enable it to seek out another instance for the service which may be available, for example, in another SLEE executing at the same site, or, at instantiated at another service node location, for example, and the process returns. Further to the SleeThread instantiation process is the initialization of its PriorityEventQueue. If the maximum value of thread instances for that service has not been exceeded, then at step 968, a determination is made as to whether a threshold value of thread instances for that service has exceeded. If a threshold value of thread instances for that service has been exceeded, then at step 969, a warning is issued to NOS local resource management function that the service threshold has been reached, as discussed in greater detail herein. Finally, at step 970, regardless of the output at step 968, a new SleeThread instance for the requested service is allocated, a priority event queue is initialized for that requested service and the thread is started with control being returned to the SAg instance for that service. Returning back to the Service Agent (begin) method functionality as shown in FIG. 8(c), after the thread manager has allocated the thread for the service instance, object variables relating to the thread are initialized at step 946, and a new object instance of the requested service is instantiated by invoking a (clone) method. Then, at step 948, the new cloned SLP instance is set into the new allocated thread. Then, at step 950, a decision is made as to whether there is event information that is needed to be associated with that call instance, e.g., all the IAM information that had been extracted from the input message stream. If there is event information associated with the new cloned SLP instance, then this it is pushed onto the thread as indicated at step 952. Whether there is event information to be pushed onto the thread or not, the new allocated thread for that SLP is started, waiting for the asynchronous arrival of service-related event information which is processed by the SA (continue) method. As mentioned, the SleeThread allocated for that call maintains a priority event queue for holding all service related event information received during processing. All events related to service processing has an associated priority and the thread will manage processing of event information according to its priority, i.e., its placement in that service's event queue (not shown). Finally, at step 954, the thread event loop is started for that call instance.

It should be understood that the SA (continue) method is essentially the same as the (begin) method shown in FIG. 8(c), with the difference being that SA (continue) method is directed to channeling real-time service-related events with a service process thread that has already been instantiated for that call instance. Thus, the Service Agent's continue method receives events and identification parameters of the call instance, re-allocates the service thread associated with the tid, orid parameters for the received event, and pushes the event to the thread's event priority queue. It should be understood that both the SAg and SM classes both comprises an IDL interface to NNOS. Services (SLPs) do not have such an interface however, are able to communicate system wide with via its SAg interface.

During real-time service processing, the SLEE 450 is able to perform the following: 1) interpret instructions at SLP and SIBB levels during service processing; 2) deliver the incoming events to the designated instance of the SLP; 3) generate trace data if a tracing flag is set; 4) allow tracing turned on at SLP, SIBB, and SLEE levels and send the trace data to a specified output; 5) generate SLEE usage data and send the run time usage data to a specified output; 6) generate the exceptional data (errors) and performance data for network management; 7) receive a message/request for adding new instances of SLP or utility programs and add such new SLP or utility program instances without interrupting and degrading the service processing; and 8) support the same service by multiple Service Control instances for load sharing.

When a service instance has finished processing, it will either initiate the termination of the service or, another process in communication with the service will. In either event, the SAg (end) method is called which functions to terminate the thread instance associated with that call. This is accomplished by invoking a ThreadManager (release) method, passing in the Tid and Orid identifiers uniquely identifying the call instance, pushing any events onto the thread's event queue, and releasing the call, i.e., terminating the thread instance and/or placing the thread instance back into a thread pool.

Preferably, a SleeThread class instance provides the functionality needed for NGIN services to execute concurrently without tying up all the SLEE resources and, facilitates co-operative resource sharing. Specifically, there is a one-to-one mapping between SleeThread and a service instance with the SLEE associating one instance of a SleeThread with one instance of a service, i.e., for every call that is handled by a service there is one instant of SleeThread associated with the call. The SleeThread also acts like a data warehouse for the services by housing a transaction id (tid), object reference id (orid), object references, e.g., both peer and agents, an SLP, and the priority event queue associated with the SLP. More particularly, a SleeThread acts like an event channel between the service(SLP) and the ServiceAgent by implementing two key interfaces: a PushConsumer for enabling the ServiceAgent to push events on the SleeThread; and, a PullSupplier enabling services to pull events from their associated thread.

The IDNA/NGIN Network Operating System ("NOS") component 700 will now be explained in greater detail in view of FIGS. 8(b)–10. As mentioned, NOS functions include enablement of inter-process communications, object connectivity, and resource management functions for the IDNA/NGIN system 170. Because all IDNA/NGIN processes execute on a variety of hardware and operating system platforms in a widely distributed architecture, NOS provides platform-independent and location-independent communications among all processes. Particularly, NOS comprises several functional sub-components to provide the interface between all NGIN processes, including the interfaces between service execution and control, service administration, and data management. The NOS is also the interface between the switch fabric (resource complex) and call and service processing (FIG. 1), and, enables two or more processes running on the same SLEE to communicate with each other.

As shown in FIGS. 8(b)–10, the NGIN NOS functional sub-components include: 1) a Name Translation ("NT") process 570 that resolves logical names for data and service objects to physical addresses that identifies both the computer (as a network address) and the memory address in which the requested object is running; 2) Local Resource Management ("LRM") processes 575, 577 that tracks and maintains the status of resources at a service node; 3) a global Network Resource Status ("NRS") process 590 that maintains the status of all service node resources throughout the entire NGIN network; and, to provide inter-process communications, 4) a set of services for providing object connectivity, such as that provided by a Common Object Request Broker Architecture compliant ORB, such as provided by Orbix®, developed by IONA Technologies of Cambridge, Mass., and Dublin, Ireland, or like equivalent, which enables communications among objects across different computing platforms, API message sets, and Internet Protocol (IP) communications, particularly by mapping logical names of objects to physical addresses in a manner such as to meet or exceed certain real-time call processing performance requirements.

At system boot, the SLEE 550 is started and launches within its environment an instance of a NOS client component 558 and Service Manager process component 554. The SM SLP 554 retrieves the logical name for other components from that node's configuration file(s) 580 comprising the logical names of services to be immediately instantiated. It then provides the logical name to the ORB name service, which maps that logical name to a physical address. The ORB maintains service object connectivity from that point on. The ORB name service is also used for other services' registrations. Each service started on a SLEE registers itself with NOS and it is through these registrations the ORB identifies physical addresses for logical names.

To implement platform independent communications among interactive objects, interfaces are defined, as enabled by an interface definition language ("IDL"). CORBA currently supports IDL, however other object-oriented communication technologies such as remote method invocation (RMI) protocol may be implemented as long as performance requirements are met for real-time call processing. Particularly, the interfaces for each of the IDNA/NGIN components are defined at the time of their creation and are made available at run-time by storing them in a persistent data store or library (not shown) associated with the local LRM 575. Services are enabled to query this library to learn about new object interfaces. The NOS client process 558 and NOS master 560 is a NOS class library that is used for interfacing with NOS services and is used by all services running within that SLEE to call on NOS NT and LRM services, as is now described with reference to FIGS. 8(b)–11.

FIG. 8(b) illustrates the functional architecture of NOS NT functional sub-component 570 and LRM functional sub-component 575 residing on a computer executing one or more SLEEs 550 and 550', with an NT and LRM sub-component associated with each SLEE. FIG. 8(b) particularly depicts an example of a single IDNA/NGIN service node or "site" 204 having at least two computing systems 440 and 440' implementing respective SLEE components 450 and 450' and respective NOS components 700 and 700' that each include a respective NT functional sub-component 570 and 570', and a respective LRM functional sub-component 575 and 575'. Although a single SLEE is shown executing on a separate computer, it should be understood that two or more SLEEs can operate on the same computer. Running on each SLEE 450, 450' are several service objects or processes labeled S1, . . . , S4 which may be call line logic, service logic or call processing logic programs, a persistently running feature discriminator object program, or a NOS client object 558, or other process.

As described herein, each NOS NT functional sub-component 570, 570' includes a process for identifying the correct version of a data or service object to use, and the optimal instance of that object to use, particularly by allowing a process to call on any other process, using a single, common logical name that remains unchanged throughout different versions and instances of the called process. Thus, the NOS NT component 570 encapsulates object references, versioning, and physical locations of instances from processes.

As described herein, each Local Resource Manager ("LRM") component 575, 575' of NOS 700 at each service node determines which services to execute on which SLEEs at a node, per configuration rules contained in service profile (configuration) files 580, which may include the contents of the service profile an example of which is depicted herein in Table 2 and deployed from the SA component for storage in the local cache. The LRM first reads this service profile file 580 stored in the local cache 415 (FIG. 8(*a*)) at that node, and determines which specific SLEE to run a service on in accordance with the rules in the service profile file and, which services are to run actively (as persistent objects) in the SLEE, or are to be instantiated only on-demand.

Specifically, the SA generates for each service a service profile, which may be embodied as a formatted data file in SA, that specifies that service's requirements and to which SLEE(s) and/or computers within the network it should be deployed. An example service profile for a particular service to be deployed in the network is depicted in Table 1 as follows:

| Profile Name: | Service 1001 for Customer X Announcements |
|---|---|
| Operating System: | All Unix |
| Processing Units: | 200 Units |
| Memory Units: | 30,000 Units |
| Disk Units: | 2,000 Units |
| Instantiate (Time Range, Min, Max): | 00:00–23:59, 1, 5 |
| Data Communication Unit (Average): | 10,000 Units |
| Data Communication Units (Burst): | 30,000 Units |
| Voice Playback Required | |
| Data Management Required: | Data Set 1001 |
| Service Start Date: | 01-01-1998 10:00 |
| Service End Date: | None |

Table 1

In Table 1, there is specified: a service profile name, e.g., service #1001 for a customer X; amount of processing units, memory, and disk space required to execute the service when instantiated; a node instantiate field(s) specifying a time range when a particular service (embodied as a service logic program, for example) is to be instantiated according to a predetermined business rule(s) specified in SA, and a corresponding min/max field(s) indicating the minimum and maximum number of those service objects (SLPS) that may be instantiated by NOS during the specified time range; a special requirements field(s) indicating for example, that the service requires a particular service node capability, e.g., voice playback; and, a service start data and service end date. It is readily apparent that SA may distribute the service (and service profile) of the example service 1001 of Table 1 to those service nodes having the memory requirements and the voice playback support. It is additionally apparent that the example service #1001 depicted in the service profile in Table 1, requires a data set from customer X that would comprise, inter alia, a voice playback service announcement specific to that service #1001 provided by customer X. The SA component 700 will receive data via order entry feed (not shown) that includes the customer X voice playback announcement, and SA's inventory manager will assign it as a data set #1001, for example, for storage in the DBOR 230. In this manner, SA may automatically distribute the dataset #1001 to the service node(s) providing the service #1001 for customer X.

A service node profiles table (not shown) and service profile table (e.g., Table 1) are input to SA and stored therein to enable automatic tracking of: 1) the capabilities of each service node, i.e., how many computers and SLEE(s), and the resource capacity of each; 2) which services and data are to be deployed to which service nodes and when; and, 3) the configuration of service execution, i.e., at which times an SLP should run persistently versus on-demand, for example. The capabilities of each node and computer in the network is maintained, so that simple and complex business rules governing data/service distribution, data/service activation and data/service removal may be applied to optimize the execution of services on IDNA/NGIN service nodes. Thus, the NOS is able to determine which service to instantiate as a persistent object (to run actively) on which SLEE, and at which times, with rules based on one or more criteria including, for example, load balancing among service nodes, network call routing efficiencies, and service demand. Rules provided in the service profile file (Table 1) generated by SA will reflect these criteria.

Referring back to FIG. 8(*b*), the LRM 575 enables run-time configuration and optimization of service execution, by tracking the health and status of each service resource in the manner as will be described in greater detail. Particularly, each LRM functional sub-component maintains a list of all services that are programmed to run on that SLEE, which service processes (object references) are actively running on a SLEE, and the current load status (processing capacity) of the SLEE(s) at that node based on predetermined thresholds.

More particularly, the LRM component 575 of NOS is a set of libraries built into a local cache of object references corresponding to every object (logic program) in the system, and which object reference contains the information about the server, such as IP address and port number, to enable communication. When new objects become available within the system, they are registered with NOS, i.e., an object reference is created for them for registration in the local cache through data management.

After querying its service profile (configuration) file 580 to determine which services are to be immediately instantiated, the NOS LRM component 575 sends a service activation request from NOS NT 570 to the active Service Manager object 554 in SLEE via the NOS client instance 558 also executing in the SLEE 450. The SM object 554 is an API object for enabling control of SLEE services. For example, it provides the capability to instantiate new services when a request for an inactive service is received. That is, it is capable of assigning a process thread to the object when it is instantiated and the service then registers itself with NOS via LRM 575 as depicted generally in FIG. 9. As a service is called by another service, using its logical name, the LRM uses the rules in the configuration file to determine which instance to invoke by utilizing the ORB name service to map the logical name to physical addresses of active instances.

As shown in FIG. 8(*b*), associated with an NGIN site or service node 204, is a site LRM 577 running over a NOS component 700" on a separate computer 440", or on a shared computer, such as computer 440 or computer 440'. The Site LRM 577 functions to: 1) track the availability of services at each SLEE, which is a function of current loads of all processes running on each SLEE; and, 2) maintain a resource status list that is an actively updated copy of each individual SLEE LRM 575, with the addition of a SLEE identifier for each resource. The site LRM sub-component 577 determines which instance of a requested service should be used based on any of several criteria, including, but not limited to: 1) the proximity of a called service instance to the calling service instance (same versus different SLEE, same versus different site); 2) the proximity of the called service instance to the Data Management data that is needed by the called service; and, 3) the current system and process loads.

As an example, illustrated in FIG. 8(b), whenever a process, for example, S1 in SLEE 1, needs to instantiate an SLP, S4, to perform a particular process, e.g., Vnet service, NOS first makes a determination as to whether the service, i.e., its object reference, is available in the local cache, for example, in SLEE 1. If the local LRM 575 does not have the requested object reference, NOS seeks out the site level LRM 577 to determine the location of that particular object reference corresponding to the requested service. For instance, as shown in FIG. 8(b), that object may be found in SLEE 2, and when found, NOS will make available that service by instantiating an instance of that object, if SLEE to has the capacity for doing so, i.e., its utilization threshold has not been reached.

Figure 10:
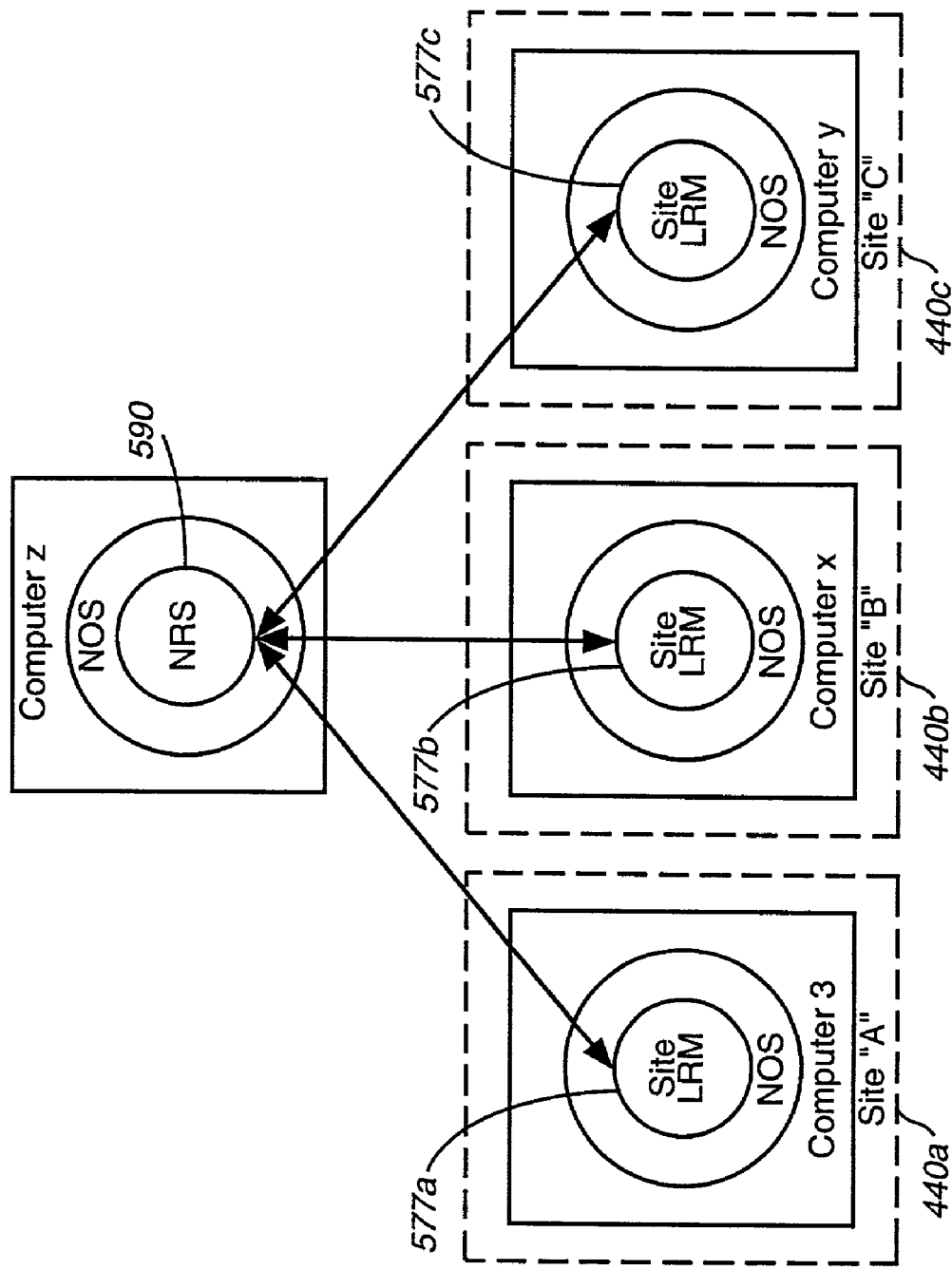
FIG. 10 illustrates the functional architecture of the NOS NT and LRM functional sub-components.

As further shown in FIG. 10, in addition to a respective LRM 575 for each SLEE and LRM 577 for each site, the NOS component 700 further includes a Network Resource Status ("NRS") sub-component 590 which is a process that performs a network-wide resource management function. Particularly, the NRS includes a subset of data maintained by each site LRM, for every Site LRM in the network, for example, site LRMs 577a, ... , 577c corresponding to sites labeled 440a–440c in FIG. 10. The NRS 590 includes: 1) a list of SLEEs; 2) which types of services are programmed to run on each SLEE, and 3) which services are actively running on each SLEE, i.e., the SLEE's current load as a per-cent basis. This NRS sub-component 590 is a logically centralized function giving NOS another level of propagation for requests that the site LRMs 577a, ... , 577c can not satisfy. Additionally, the NRS sub-component 590 includes an indicator for each SLEE 450 to indicate whether that SLEE is up or down, and whether a service utilization threshold has been reached by that SLEE. The "up or down" indicator and the utilization threshold application are used to determine if a SLEE is available to accept service requests from other services and the NRS sub-component can simply provide a binary indicator of whether or not a SLEE is available given these indicator and threshold applications. As an example, if a requested SLP object is found in a SLEE, but that SLEE does not have the capacity to instantiate the requested process, it will send a notification to the site LRM 577 that the utilization threshold for that SLEE has been reached and is incapable of handling further requests for that service. This information will also propagate to the NRS component 590.

Preferably, each node implements a monitoring system 595 (FIG. 8(a)) for monitoring the memory capacity, database capacity, length of a queue for requested objects, amount of time in queue, and other resource/load parameters for each SLEE in the system. These factors are made available to NOS 700 which makes a determination as to the SLEE's utilization threshold based on one or more of these factors. In addition to a fixed threshold, multiple thresholds may be used for hysteresis.

The functions performed by NT, LRM, and NRS enable NOS 700 to provide location-independent processing, while optimizing the overall processing capabilities of NGIN, is now described in greater detail in view of FIGS. 11–15a and 15(b).

Figure 11:
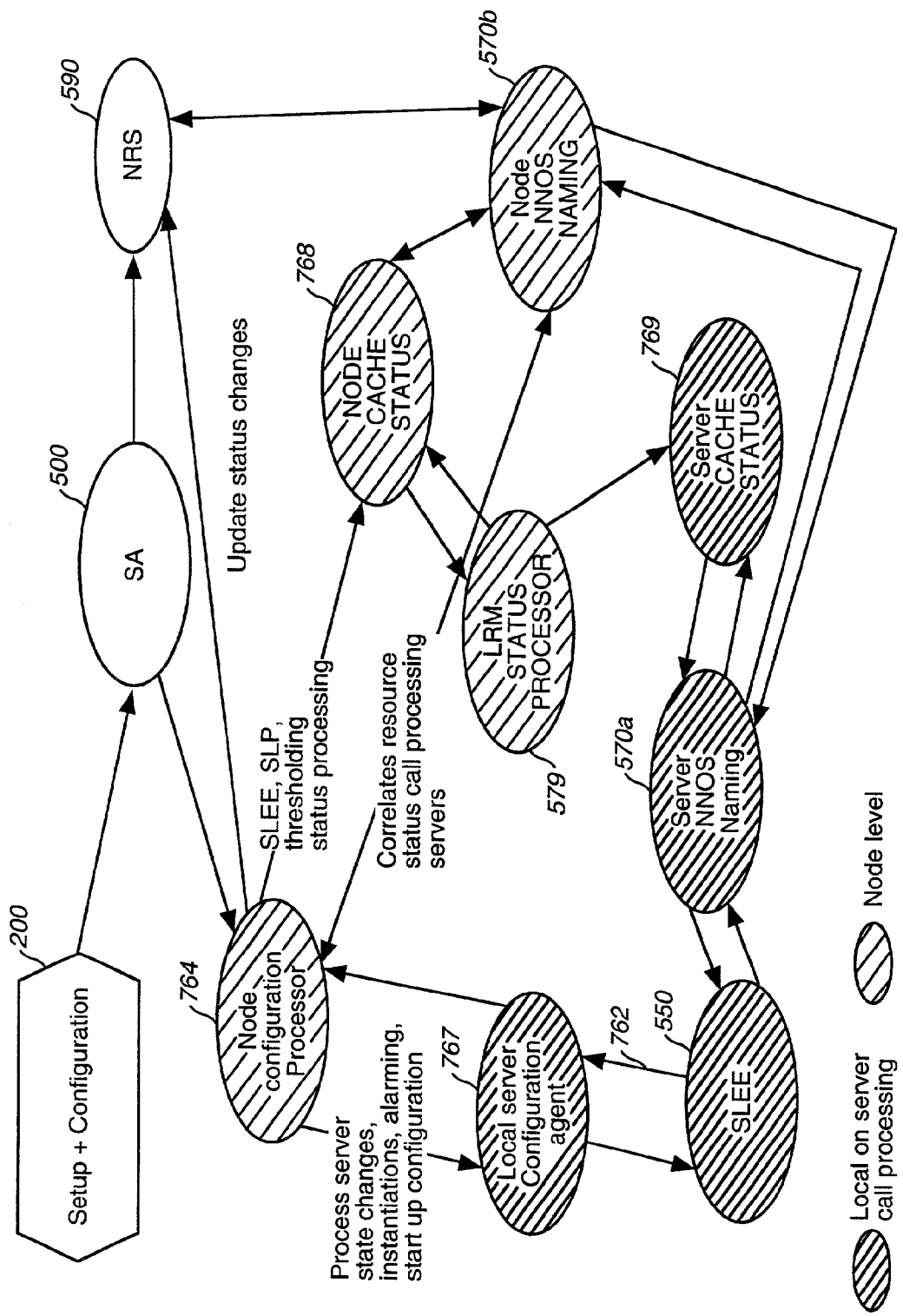
FIG. 11 illustrates the architecture of the resource management system for the intelligent network.

As shown in FIGS. 8(a) and 11, service packages including SLPs data and other components are configured (as configuration packages) and down loaded from SA component 500 to node configuration files provided at a node configuration processor ("NCP") 764 located at each individual service node, and, downloaded to the NRS 590. The configuration data downloaded to SA comprises a data structure pertaining to a service profile including: 1) the service name (for each service); 2) the in-service date/time for each service; 3) the out-service date/time (if any) for each service; 4) a service dependency, e.g., databases to be loaded with memory and other processes (SLPs) for the current service to run; 5) service calendar, e.g., day of week holiday including start time duration, start-up load volume (expected load); 6) load rate per instants; and, 7) threshold percents. As an example, for a particular service, if the load threshold for the SLEE is 100/service instance and an expected load volume is 200, then at least two (2) and preferably three (3) instances would need to be available for supporting that service at the SLEE.

The configuration data delivered to and maintained at the NRS component 590 includes: the service name for each service at each node; the capability of the service, i.e., an indicator that the hardware and software required to run that service is available at a node; and, a node status for that service which may include the following sub-classes: 1) active; 2) overload; 3) out-of-service; and 4) shut down, e.g., going into maintenance. For example, a service node may be capable of providing a service but inactive, i.e., service is not instantiated, but capable of being instantiated. When a service becomes instantiated, the service's status at that node becomes active. The NRS system 590 thus looks at capabilities and status to determine whether it may receive a request to activate a service at a particular node.

As further shown in FIG. 11, each node configuration processor 764 maintains and accesses a node cache status ("NCS") database 768, having information including what that node has currently running on it including: the service object name and object reference; the node and the SLEE; its status (active permanent/temp, alarm level, out of service, removed); the time stamp of the last status message, the time stamp of the last change (update) and, the time stamp of the last LRM status process check. The NCP 764 further has access to the configuration file so that it can monitor when to start and bring-down processes. Particularly, the node configuration processor 764 reads the configuration file and kicks off the instantiation of a SLEE or changes the status from permanent to temporary when the time runs out. A local server configuration agent process 767 is the mechanism enabling the communication between the SLEE 450 and the NCP 764 and LRM systems 577 (FIG. 11). The SLEE 450 may, for example, issue an alarm threshold signal 762 indicating that the service at the SLEE may no longer be or currently is not available. This signal is communicated to the service node configuration processor 764 which changes the status of the service in the node cache status database 768 to indicate an alarm level, e.g., temporarily out-of-service, or removed, and, further queries the NCS node cache status database to determine if this service is currently running on another SLEE(s). Based on this determination, it may either instantiate another SLEE or instantiate a new thread for that service on another SLEE. Thus, when the NOS makes a name translation assignment, it is based on the data in the node configuration processor.

Additional data that is kept and maintained by the node cache status database 768 includes SLEE service status data profiles associated with SLEEs that are instantiated at a service node. This SLEE status profile includes a SLEE name; a SLEE object reference; a SLEE status including active, temporary, alarmed, out-of-service, or removed; a time stamp of the last status message sent from the SLEE to the node configuration processor; a time stamp of the last status change (update); a time stamp of the last heartbeat with indicates the last time a message is sent to check on the SLEE from the node configuration processor; a time of the alarm level; and a time of the alarmed level when it is cleared. Additionally maintained as part of the SLEE status data is the schedule of the SLEE active time and, the schedule of the SLEE shutdown time with the shutdown status being either hard, meaning the SLEE will shutdown regardless of whether calls services are currently executing at that SLEE or, soft, meaning that the SLEE will shutdown after all calls are completed or removed.

It should be understood that the real-time call processing system runs independent-of the resource maintenance system, i.e., the same data is used, but different processes perform the maintenance. Particularly, as depicted in FIG. 11, NOS naming processes 570a,b are provided which is a real-time process agent for processing run-time service requests. On the other hand, the node configuration processor 764 performs an administrative function and is responsive to: input from SA; an alarm and status inputs from a SLEE; and, requests to instantiate new processes from NOS naming, as will be hereinafter described.

Figure 12A:
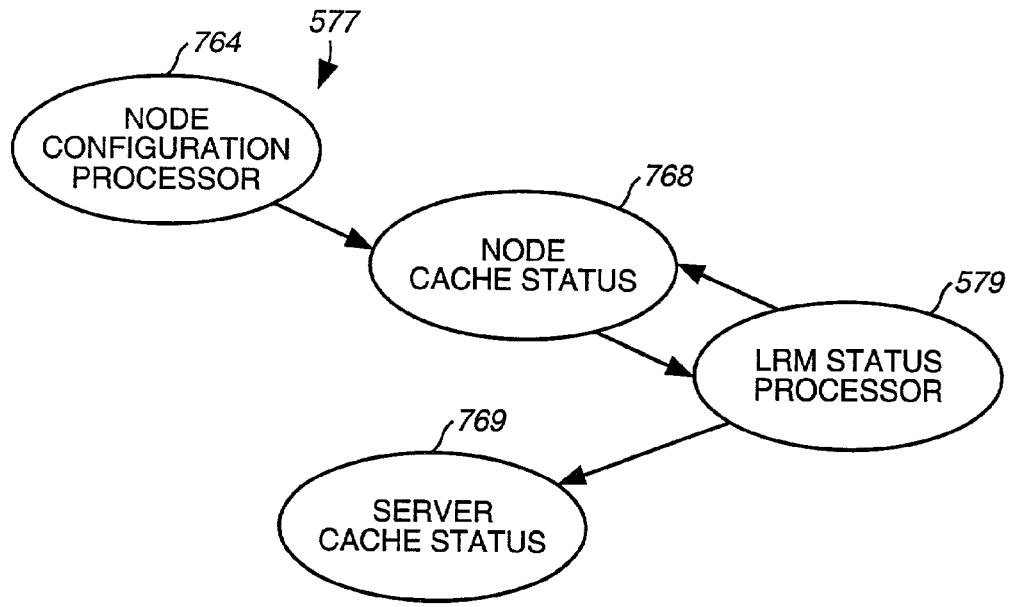
FIG. 12(a) illustrates the local resource management status processor flow.

As shown in FIGS. 11 and 12(a), the LRM system 577 comprises the following subcomponents: an LRM status processor 579, the NCP 764, the NCS 768, and the (local) server cache status database 769. Optionally included is the local server configuration agent 767 which functions as an interface between the SLEE and the NCP 764. The LRM status processor 579 is the object that reads the NCS database 768, looks for any status changes or updates (FIG. 12(a)), and distributes any changes or updates in status to the local server cache status database 769 where the local cache maintained. Chronologically, as depicted in FIG. 12(a), the node cache database 768 is updated first with any current active running services at each SLEE along with a recorded time stamp of the updates. The LRM status processor ("LSP") 579 periodically polls the node cache database, e.g., every two seconds, to look for any update changes which are to be distributed to the computing system caches supporting the respective SLEEs. For example, the LSP will read the NCS and pick up all status changes with a time stamp greater than the time stamp of the last LSP poll, and further, updates the copy to the local server cache status 69. Thus, for example, if node cache is lost during a failure condition, the local nodes may run on the current copy of the status at the local level (server cache status).

Figure 12B:
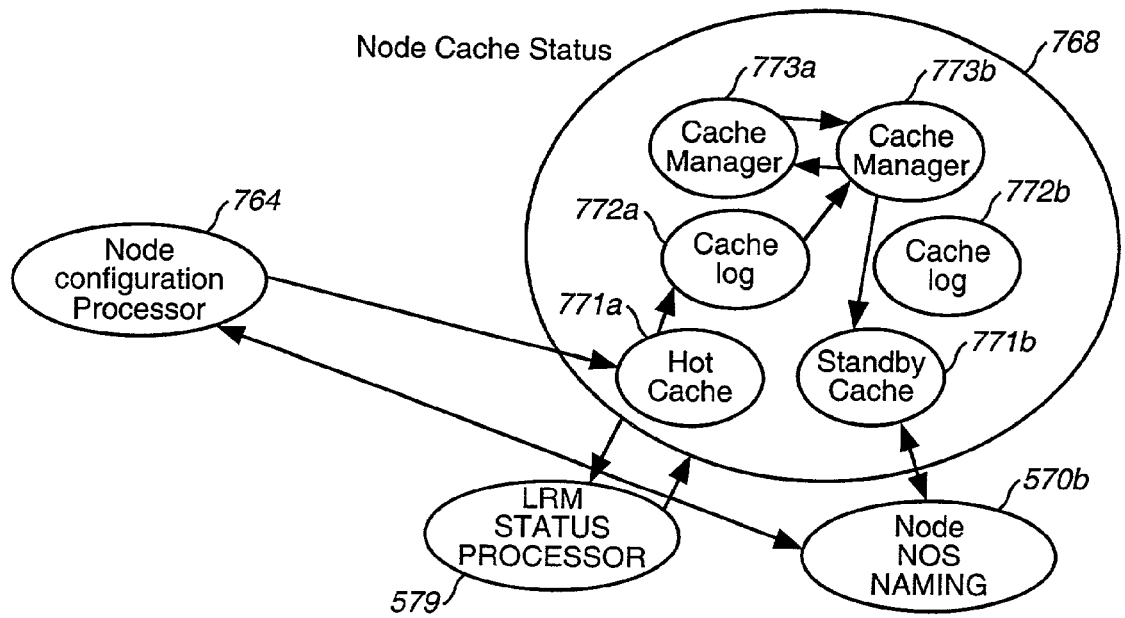
FIG. 12(b) is a more detailed illustration depicting node cache status database architecture.

FIG. 12(b) illustrates a more detailed architecture of the node cache status database 768. As shown in FIG. 12(b), there is provided two cache systems, preferably residing on different servers: 1) a hot cache 771a functioning as the current cache resource, and 2) a standby cache 771b functioning to maintain the hot cache resource in near real-time. At different times during the operation of the resource management system of the invention, the hot cache 771a is used as the main repository of node cache status data. This data is periodically updated to one or more cache logs 772a,b under the control of one or more cache manager processes 773a,b. It is the function of the cache manager processes 773a,b to reference a cache log 72a,b to obtain updated status information from the hot cache and input it into the standby cache 771b for redundancy. In the preferred embodiment, there is a small lag time ranging from about 5 to 15 milliseconds between the time a hot cache 771a first receives status updates and the time it takes for the cache manager to update the standby cache 771b. At such time that there is a failure in the node cache database, or, when the hot cache 771a is currently unavailable to receive further updates, the system switches from the hot cache 771a to the standby cache 771b which then functions as a hot cache. For maximum performance, the cache switch over from hot to standby takes place within about 50 milliseconds. It should be understood that the cache manager periodically checks the hot cache 771a to insure that it is still up and functioning and to insure quick changeover to standby cache 771b. Additionally, each cache manager 773a,b registers itself with each of the three major processes that access the node cache status database including the node configuration processor 764, the LRM status processor 579 and the node NOS naming process 570b. This is so that the three agents, i.e., the NCP, LRM status processor and node NOS naming, may be notified of a changeover, so that they each may reference the correct copy of the cache.

Figure 13:
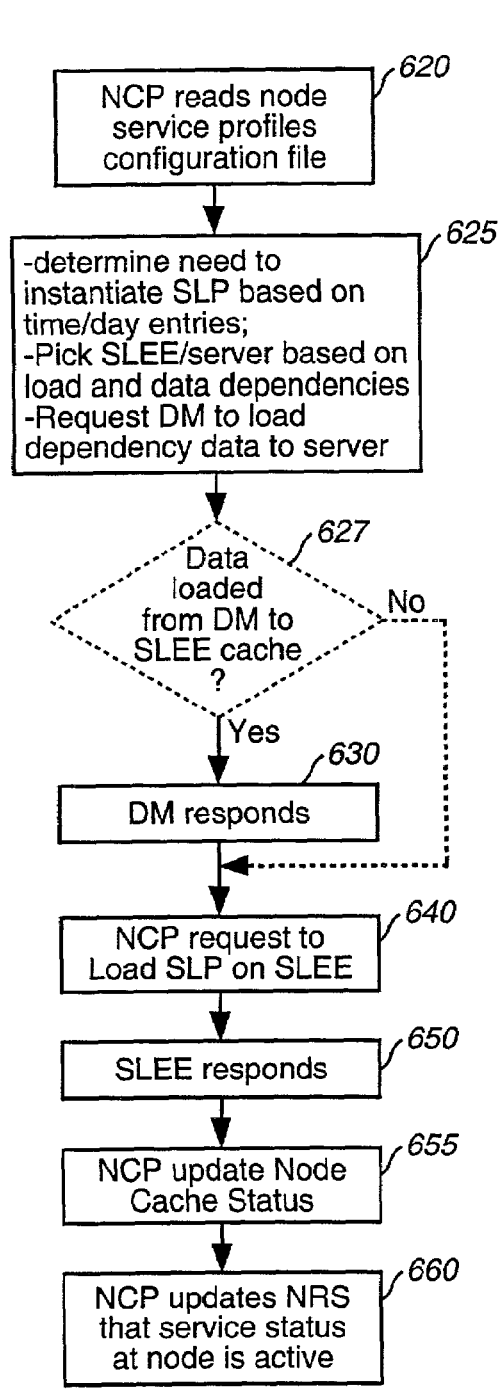
FIG. 13 is a flow diagram depicting an SLP instantiation process.

In a preferred embodiment, as depicted in FIG. 13, the first SLP instantiation process in a node is as follows: First, as indicated at step 620, the NCP reads all the service profiles in that node's configuration file, and at 625 determines which SLP needs to be instantiated, e.g., based on time of day. Then, the NCP will choose a SLEE/server based on the SLEE's current load and the service data dependency. For instance, if a database needs to be loaded (or node is inactive), the NCP 764 will request cache manager to load dependency data to the server data management. If data is already loaded from DM to the SLEE, or if data did not have to be loaded, the process proceeds to step 640. If the required data was loaded by DM, the DM will respond to the NCP when it is done at steps 630, and the NCP will request to load the SLP on the SLEE at step 640. Then, the SLEE responds that the service is available at step 650, and the NCP 764 (FIG. 11) accordingly updates the node cache status with the active service name (registered object reference for NOS name translation), at step 655. Additionally, at step 660 the status for that service at that node is updated to "active" in the NRS 590. In the case of subsequent instantiation of that service, the NRS service status may not be updated as it already has an "active" status. The NCP updates the node cache 768 with the name and the registered object reference to supply NOS, so that NOS can perform name translation. Thus, when NOS gets a request, it has an object reference to go to.

Figure 14A:
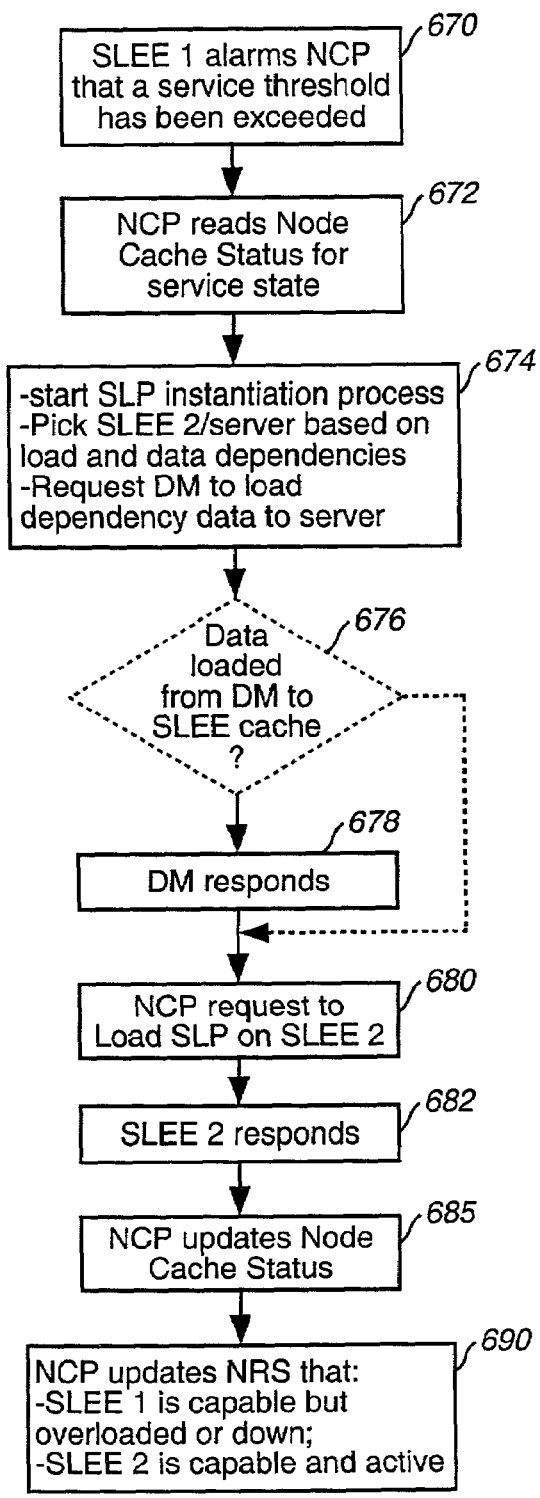
FIG. 14(a) is a flow diagram depicting the SLEE threshold processing.

The SLEE thresholding process is now described with reference to FIG. 14(a). As shown at step 670, a SLEE, e.g., SLEE 1, will issue an alarm when a service threshold is exceeded. Preferably, there are several possible levels of thresholds including: a "warning" or "overload" (a threshold level exceeded). Then, steps 672 through 685 correspond to like steps 630 through 655 of FIG. 13 with step 672 invoking a function of the NCP to read the node cache status 768 to determine if the service is running on any other SLEE at the service node. Based on load, an instantiation process may be started, particularly by picking a SLEE, e.g., SLEE 2, as shown in step 674, and any required data dependencies are loaded by the DM. After receiving the DM response at step 678 (if any), the NCP requests that the SLP be loaded on the chosen SLEE 2, and the SLEE 2 responds accordingly when the service is successfully instantiated on SLEE 2. Finally, at step 685, the NCP 764 updates the node cache status of the first SLEE 1, e.g., to a warning or "overload" condition, for example. Furthermore, the status of the service at SLEE 2 is set to active in the NRS. It should be understood that at this point, the NRS does not have to be updated, as the node is still capable and the service still active. However, if it is determined that the node has no more room to start up with the SLEE, the status may go into overload, and the network resource status may be updated to reflect that the node is overloaded.

Figure 14B:
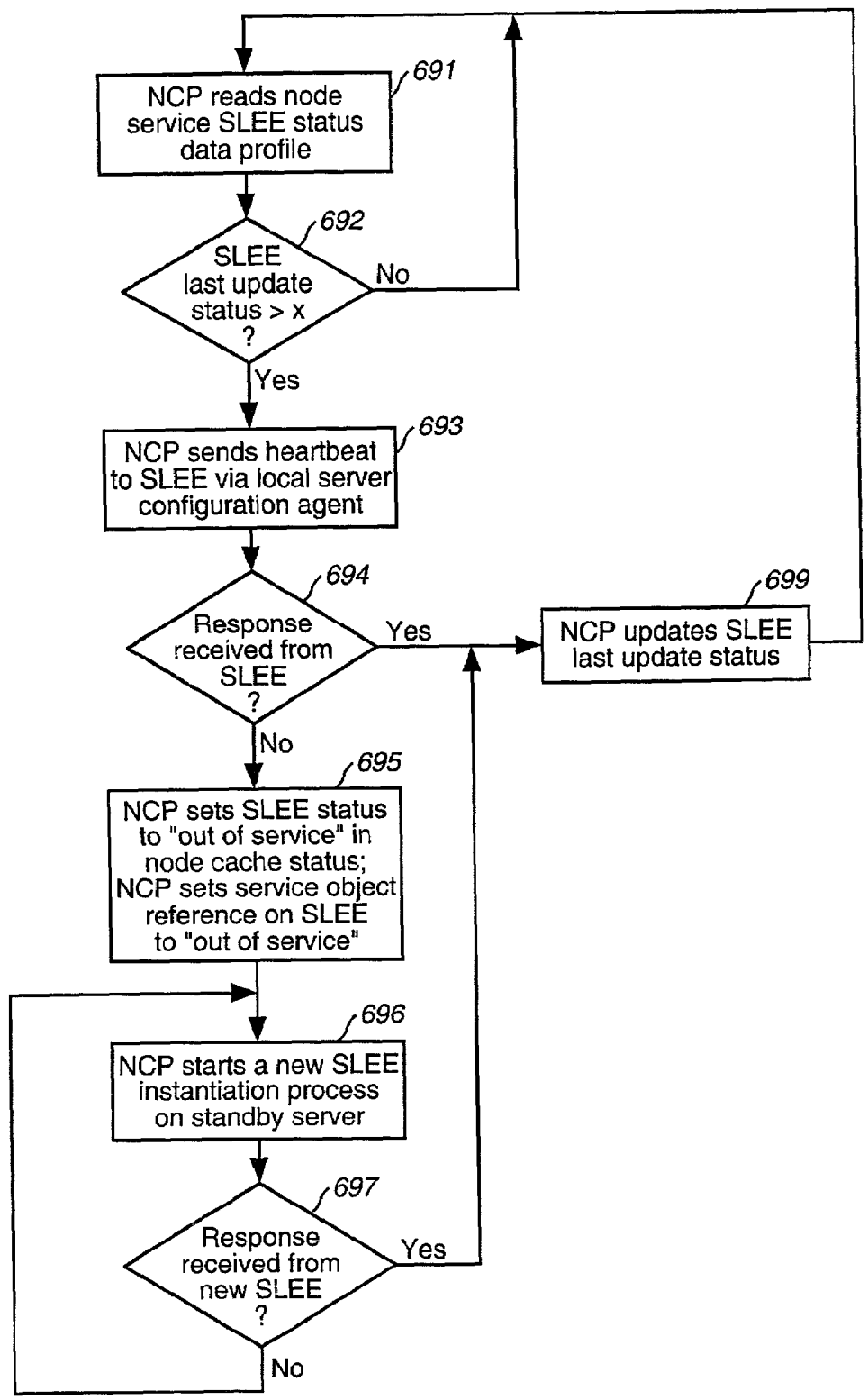
FIG. 14(b) is a flow diagram depicting the SLEE monitoring process.

Additionally built into the local Resource Management System is a SLEE monitoring process such as exemplified in view of FIG. 14(b). The SLEE monitoring process is necessary to enable update of status changes to the node cache status database 768. Particularly, the process begins by enabling the node configuration processor 764 to read the node service SLEE status data profile in the node cache status database 768, as indicated at step 691, FIG. 18(b). Particularly, the NCP determines whether a predetermined time 'x' has elapsed since the previous SLEE status update at step 692. If the last SLEE update status is greater than the predetermined time 'x', then the NCP sends a query message to the SLEE via the local server configuration agent 767, as indicated at step 693. This NCP generated query message is also known as the heartbeat. The NCP then waits for a response or an error response from the SLEE that it directed the heartbeat message to, as indicated at step 694. If the SLEE responds with update status, then the NCP updates the SLEE status profile in the node cache database as indicated at step 699. If no response or error message is received, the NCP sets the SLEE profile status to "out-of-service", for example, as indicated at step 695. Additionally, the NCP sets each service object reference on that SLEE to out-of-service, and will initiate a SLEE instantiation process on a standby server to replace the out-of-service SLEE at step 696. This may require querying the object reference library in the node cache status database to make a determination as to the service objects that were currently executing on the SLEE, and may also require querying the original configuration file to determine which services may have been instantiated at the time the SLEE went out of service. It should be understood that when the SLEE is determined to be out of service, all call states that have been executing at that SLEE are lost and may not be recovered, unless other fault-tolerant and/or redundancy mechanisms are built into the system. The start-up of a new SLEE may only recover those object instances that had been available at the time the SLEE went down. Once a new SLEE is instantiated, the NCP waits for the new SLEE to respond as indicated at step 697. If the new SLEE responds affirmatively, then the NCP resumes its updating of the SLEE status in the node cache status database at step 699. Otherwise, the NCP may instantiate a new SLEE process on another server at the service node. In either event, the process returns to the SLEE monitoring step 691.

Figure 15A:
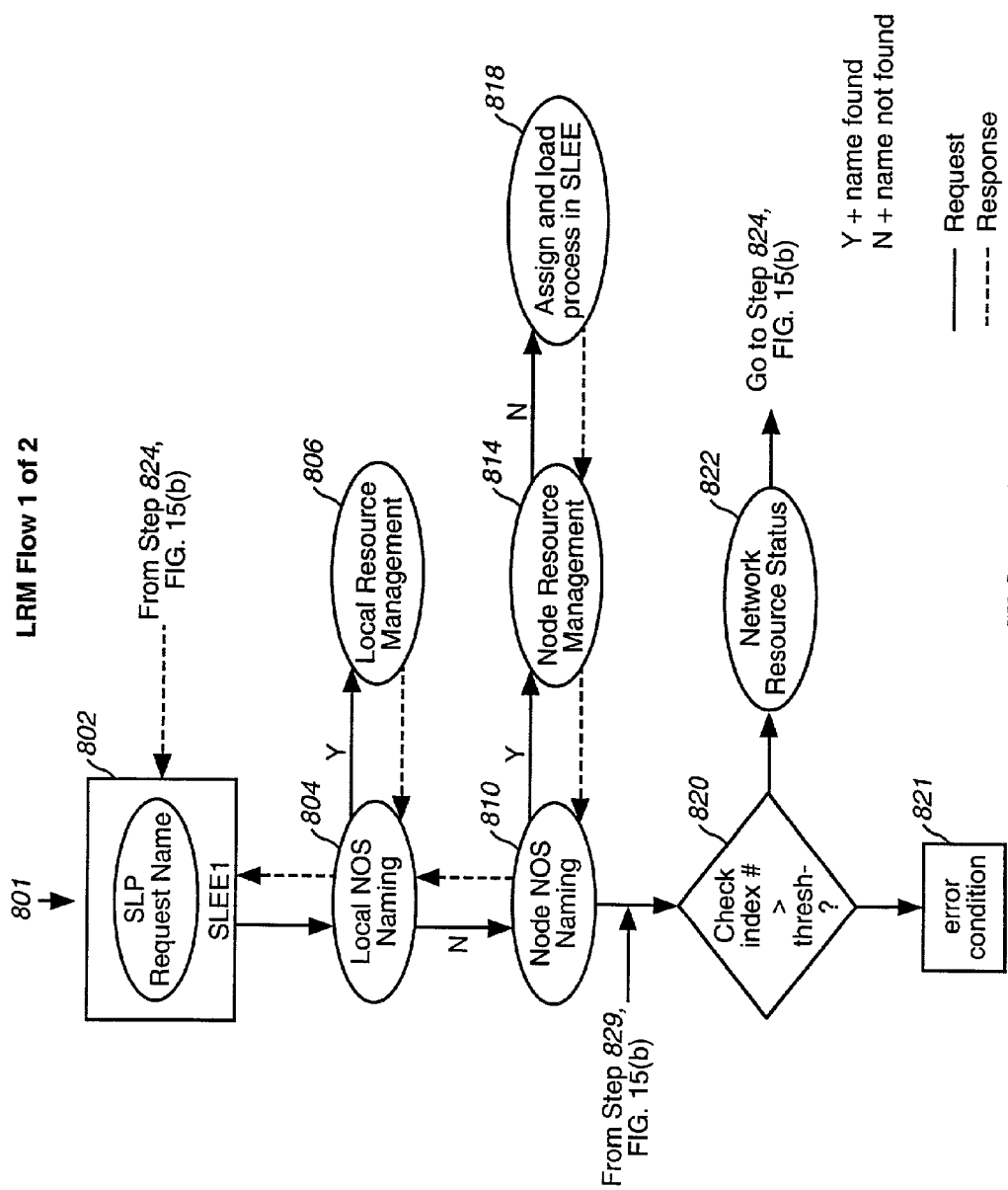
FIGS. 15(a) and 15(b) depict the three-tiered intelligent network resource management functionality.
Figure 15B:
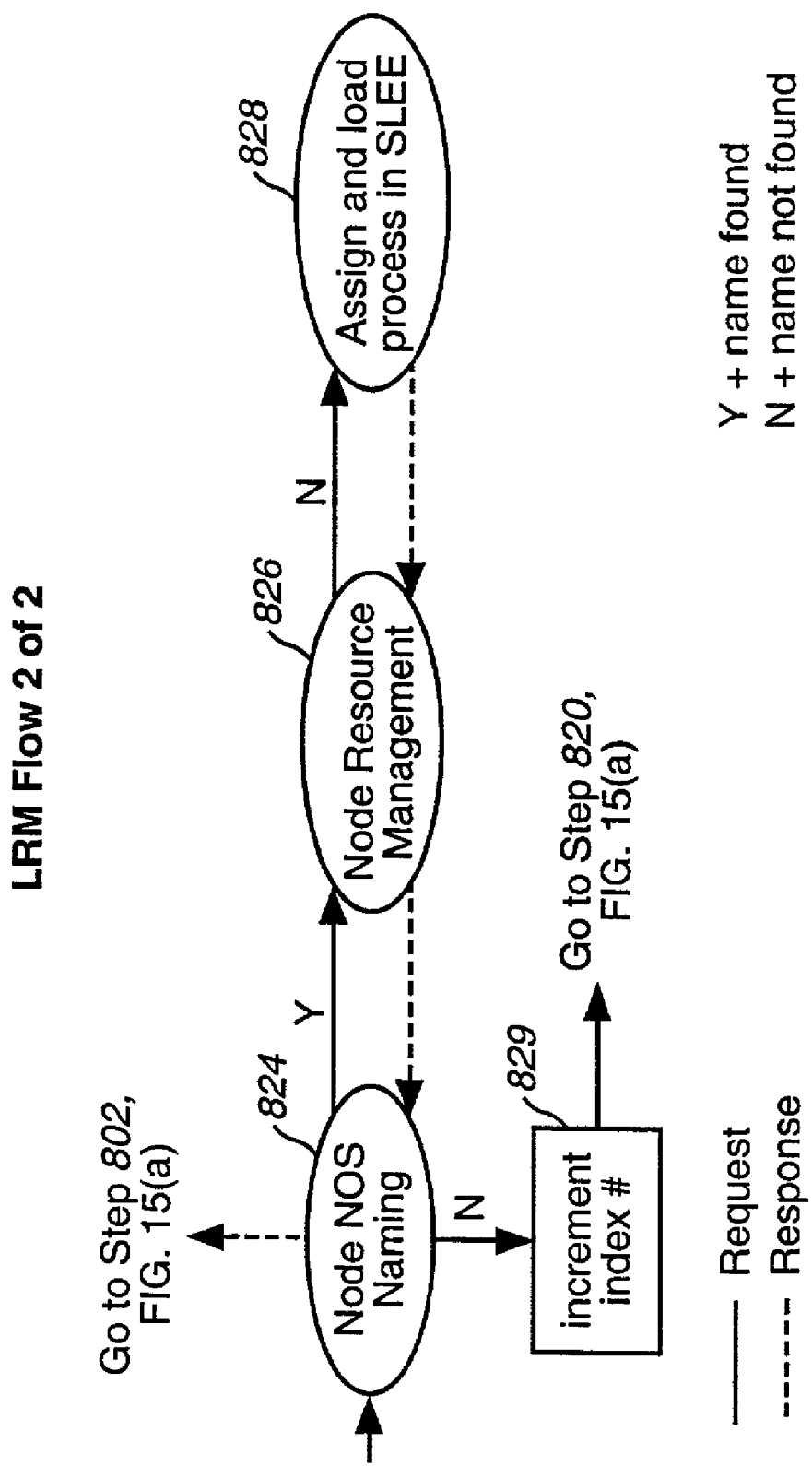

An illustrative example of the resource management functions performed by NOS including the NT, LRM, and NRS that enable NOS 700 to provide location-and platform-independent processing, while optimizing the overall processing capabilities of NGIN, is now described in greater detail in view of FIGS. 15(a)–15(b). In the LRM process flow 801 described with respect to FIGS. 15(a) and 15(b), it is assumed that a service S1 executing on SLEE 1 on a service control server 1, needs to invoke a service S2, as indicated at step 802. Service S1 may be a FD or Service logic program that has received an event service request from the switch fabric call control and needs to invoke another SLP, S2, e.g., in order to complete call processing.

Particularly, in view of FIG. 15(a), service S1 issues a request to NOS 700 using the logical name for SLP S2. When the SLP request for a service object is received, the NOS name translation function 570a is implemented as indicated at step 804, for determining if the NOS recognizes the requested service as actively running on the local service control server 1, i.e., has an object reference associated with the logical name of the requested service. Preferably, data stored in local server cache includes the following NOS naming data fields: 1) an SLP logical service name which typically is the logical name describing the service and is the name which the Feature Discriminator data point to; 2) an optional version number which describes the version of a particular service which may be needed, e.g., for a particular customer who requires that version of the service running, or a node, etc.; 3) the status including: deployed, i.e., when SA has deployed work packages to nodes but the services are not activated, active, i.e., indicating that the service is currently active, or fallback, when it is desired to fallback to a previous version of a service object, e.g., to provide a quick reversal; 4) the object name or reference which may include an IP address, port, and other information identifying the physical location of the object instance; 5) the in-service date and time and out of service date and time; 6) the error process object name, e.g., if the object is not available or unable to be activated; and 7) the fallback object name to be executed when in a fallback status. As additionally described herein with respect to FIGS. 11 and 12, the local server NOS naming process 570a is benefitted from services provided by the LRM status processor 579 which updates the local server cache status database 769 only with currently active services running in a particular SLEE in the service control server. This is so that the local server NOS name translation function may first be performed locally. When NOS first gets a name request, it looks up a logical name to obtain an object name (or object reference). NOS gets the object name from the logical name and the node LRM process determines the best instance of the requested object to address based on one or more previously noted business rules, as indicated at step 806.

If, at step 804, the logical name is recognized and the object reference is available, then the process proceeds to the LRM function at step 806 to determine active ("available") instances of S2 running on the SLEE 1, in accordance with certain criteria, such as utilization thresholds. If no active instances are found, the LRM may check to see if S2 is programmed to run on SLEE 1, but has not been instantiated. If this is the case, NOS 700 may decide to instantiate an instance of S2 on SLEE 1, if SLEE 1 has enough available capacity. As mentioned, the LRM at the server level only knows what is active at the server and knows what has been instantiated. If the object is currently active and instantiated at the local server level, then the object reference for instantiating a new thread for this service is returned to the SLP request. NOS will initiate instantiation of a new service thread for performing the service requested based on the returned object reference and returns an object reference if not already instantiated.

If, at step 804, it is determined that SLEE 1 does not have enough available capacity, or if S2 is not available to be run on SLEE 1, then at step 810, the LRM on SLEE 1 sends a service request to the Site LRM 577a, (FIG. 14). The site LRM applies similar business rules and determines if an instance of S2 is active, or should be instantiated, on another SLEE at that site. Thus, at step 810, the node NOS name translation function 570b (FIG. 11) is implemented for determining if the requested logical name is available at that node, i.e., whether another SLEE at the same or different local service control server at that node maintains an object reference associated with the logical name of the requested service. If the logical service name is recognized at step 810, the NT sub-component 570 queries NOS LRM 575 to determine which instance of S2 to use. The node LRM then applies business rules against the node cache status database 768 (FIG. 11) at step 814 in order to retrieve the desired object reference for the requested service, if active, and returns that address to the calling SLP (step 802, FIG. 15(a)). If it is determined that the service is not currently instantiated, or, that the required service on a particular SLEE may not be instantiated due to process load or other imposed constraints, then at step 818 an assignment and loading process is performed by checking the node cache status database 768, (FIG. 11), implementing business rules relating to, e.g., service proximity, data proximity, thresholding, current processing loads, etc., instantiating the requested service in the SLEE where it is determined that the service object is capable for instantiation, as described in further detail with reference to FIG. 13, and, returns the address to the calling SLP. It should be understood that a round robin scheme may be implemented in determining which service thread to instantiate when more than one service is available for instantiation per SLEE.

Returning back to FIG. 15(a), if, at step 810, it is determined that the current node does not recognize the requested logical name, i.e., the node cache does not have an object reference associated with the logical name of the requested service, or, due to applied business rules, may not instantiate the object at the node, then the global network resource status (NRS) process 590 is queried at step 822 to check the current status of SLEEs across the intelligent network 170 and to determine a SLEE which may handle the service request for S2. Prior to this, as indicated at step 820, a check is made to determine whether an index number representing the number of times that network resource management has been queried to find an object reference, has exceeded a predetermined limit, e.g., three times. If this threshold has been exceeded, the process terminates and the administrator may be notified that the service object cannot be found and that an error condition exists, as indicated at step 821. If the NRS query threshold has not been exceeded, then as indicated at step 822, the NRS process 590 determines which service node in the network may be capable of performing the requested service.

After determining the node in the intelligent network, as indicated at step 822, the process continues to step 824, FIG. 15(b), where the node NOS name translation function 570b is implemented to obtain an object reference associated with the logical name of the requested service. If the logical service name at that node is not recognized at step 824, then the NRS query index number is incremented at step 829, and the process proceeds back to step 820, FIG. 15(a), to check if the index number threshold has been exceeded in which case an error condition exists. If, at step 820, FIG. 15(a), the NRS query index has not exceeded its predetermined threshold, the NRS process 590 is again queried at step 822 to find a new location of an available service at another service node.

If the logical name is recognized at step 824, then the process continues at step 826, to determine an address associated with the requested object reference in accordance with acceptable processing loads. This address is then returned to the requesting SLP as shown at step 802, FIG. 15(a). If, at step 826, it is determined that the service is not currently instantiated (active), then the process proceeds to step 828 to enable an assignment and loading process by checking the node cache status database 768 at that node, implementing business rules, and, instantiating the requested service in the SLEE where it is determined that the service object is available for instantiation. Subsequently, the address of the instantiated object SLP is returned to the requesting client at step 824.

Once an active instance of S2 has been selected, the object reference for that S2 instance is returned to NT on SLEE 1 (step 802). The NT then effectively translates the logical name S2 to an object identifier for the selected instance of S2, and uses that object identifier for S2 in the proceeding inter-process communications between S1 and S2. The object identifier includes an IP address, port, and other information identifying the physical location of the object instance. Once an object reference is determined, NOS then provides object connectivity between the two services by implementing the CORBA-compliant ORB, and data communications connection less protocols such as UDP/IP. The location of the called service, whether running on the same SLEE or on another SLEE at another site thousands of miles away, is completely transparent to calling service. Thus, if an SLP that is needed to service a call is instantiated on a SLEE at a remote site, the call is still held at the switch on which it was received. Preferably, once an object reference is accessed once, for example, at another site via the NRS level, NOS ensures that the object reference is cached at the requesting site for future reference, and audited, through service administration. Thus, in the instant example, in order to reduce subsequent look-ups by initiating a site LRM look-up when this service is again needed, the object reference for service S2, wherever it was located, is thereafter cached in the local cache in the LRM 575 of SLEE 1. It should be apparent to skilled artisans that there are a variety of ways in which service object reference data may be provided at a SLEE. For instance, a NOS data replication mechanism may be employed to replicate all object references at a site LRM 577 to each and every LRM for every SLEE at the site.

It should be understood that this three layer resource management hierarchy (LRM, site LRM and NRS) shown and described as the preferred embodiment herein, may be modified by skilled artisans. For example, additional NOS resource management layers may be built into the hierarchy with a plurality of regional NRS components provided, each of which may communicate with a single global NRS.

A few preferred embodiments have been described in detail hereinabove. It is to be understood that the scope of the invention also comprehends embodiments different from those described, yet within the scope of the claims.

For example, the general purpose computer is understood to be a computing device that is not made specifically for one type of application. The general purpose computer can be any computing device of any size that can perform the functions required to implement the invention.

An additional example is the "Java" programming language can be replaced with other equivalent programming languages that have similar characteristics and will perform similar functions as required to implement the invention.

The usage herein of these terms, as well as the other terms, is not meant to limit the invention to these terms alone. The terms used can be interchanged with others that are synonymous and/or refer to equivalent things. Words of inclusion are to be interpreted as non-exhaustive in considering the scope of the invention. It should also be understood that various embodiments of the invention can employ or be embodied in hardware, software or microcoded firmware.

While the present invention has been disclosed and discussed in connection with the above-described embodiment, it will be apparent to those skilled in the art that numerous changes, variations and modifications within the spirit and scope of the invention are possible. Accordingly, it is, therefore, intended that the following claims shall encompass such variations and modifications.

What is claimed is:

1. An apparatus for managing resources in a telecommunications system employing an intelligent distributed network architecture, comprising:
an intelligent distributed network architecture node, the intelligent distributed network architecture node including:
an intelligent call processor;
a network management system agent coupled to the intelligent call processor;
a service layer execution environment coupled to the intelligent call processor; and
a first resource complex coupled to the intelligent call processor, the first resource complex including a first switch fabric.

2. The apparatus of claim 1, further comprising a second resource complex coupled to the intelligent call processor, the second resource complex including an intelligent peripheral.

3. The apparatus of claim 1, further comprising an adjunct processor coupled to the intelligent call processor, the adjunct processor configured to provide additional support functions to the intelligent call processor.

4. The apparatus of claim 1, further comprising a wide area network coupled to the intelligent distributed network architecture node.

5. The apparatus of claim 1, wherein the first resource complex is coupled to customer premises equipment.

6. The apparatus of claim 1, wherein the intelligent call processor is configured to provide a local execution environment for the intelligent distributed network architecture node.

7. The apparatus of claim 1, wherein the service layer execution environment hosts the execution of managed objects, the managed objects implementing a service processing architecture.

8. The apparatus of claim 1, further comprising a second level processor associated with the intelligent distributed network architecture node, the second level processor coupled to the intelligent call processor and configured for receiving status information from the intelligent call processor.

9. The apparatus of claim 1, further comprising a network management system coupled to the intelligent distributed network architecture node, the network management system configured to be responsive to the network management system agent.

10. The apparatus of claim 9, wherein the network management system further comprises a centralized service administration component, the centralized service administration component configured to provide data storage and network management functionality.

11. A method for managing resources in an intelligent network having one or more service nodes, each service node capable of providing one or more services, comprising:
receiving a communications event corresponding to a requested service, the requested service to be performed at a service node;
instantiating a first set of service objects in a local execution environment at the service node based on the receiving a communications event, the service objects being capable of performing the requested service;
tracking the availability and execution of the first set of service objects at the service node; and
initiating instantiation of a second set of service objects in the local execution environment based on receipt of further requests for service at the node based on the status and availability information.

12. The method of claim 11, wherein instantiating the service objects further includes determining in which local execution environment the service object are to be executed.

13. The method of claim 11, further comprising maintaining a list of service nodes capable of executing service objects for a requested service in the intelligent network.

14. The method of claim 11, wherein the tracking the availability and execution of the first set of service objects includes determining sub-status for each service object, the sub-status including an active status, the active status indicating the service object can be instantiated at the service node.

15. The method of claim 11, wherein the tracking the status of executing the first set of service objects includes determining sub-status for each service object, the sub-status including an overload status, the overload status indicating the service object can not be instantiated at the service node.

16. The method of claim 11, further comprising tracking status and availability of service objects at the service node, tracking status and availability including:
generating status information from one or more local execution environments at the service node; and updating a first data storage device with the status information.

17. The method of claim 11, further comprising generating status information, the status information including an alarm indication, the alarm indication indicating the level of usage of a local execution environment.

18. The method of claim 17, wherein instantiating service objects is based on the alarm indication.

19. A computer program product for enabling a processor in a computer system to manage resources in an intelligent network having one or more service nodes, each service node capable or providing one or more services, said computer program product comprising:
a computer usable medium having computer readable program code means embodied in said computer usable medium for causing a program to execute on the computer system, said computer readable program code means comprising:
means for enabling the computer system to receive a communications event corresponding to a requested service, the service to be performed at a service node;
means for enabling the computer system to instantiate one or more service objects capable of performing the requested service in a local execution environment at the service node;
means for enabling the computer system to track the status of executing service objects for the requested service and availability of service objects at the service node; and
means for enabling the computer system to initiate service object instantiation in the local execution environment upon receipt of further requests for service at the node based on the status and availability information.

20. The computer program product of claim 19, wherein the means for enabling the computer system to instantiate one or more service objects at the node further includes determining in which local execution environment the service object is to be executed.

21. The computer program product of claim 19, further comprising means for enabling the computer system to maintain a list of service nodes capable of executing service objects for a requested service in the intelligent network.

22. The computer program product of claim 19, wherein the means for enabling the computer system to track the status of executing service objects includes determining sub-status for each service object, the sub-status including an active status, the active status indicating the service object can be instantiated at the service node.

23. The computer program product of claim 19, wherein the means for enabling the computer system to track the status of executing service objects includes means for enabling the computer system to determine sub-status for each service object, the sub-status including an overload status, the overload status indicating the service object can not be instantiated at the service node.

24. The computer program product of claim 19, further comprising means for enabling the computer system to track status and availability of service objects at the service node, means for enabling the computer system to track status and availability:

means for enabling the computer system to generate status information from one or more local execution environments at the service node; and means for enabling the computer system to update a first data storage device with the status information.

25. The computer program product of claim 19, further comprising means for enabling the computer system to generate status information, the status information including an alarm indication, the alarm indication indicating the level of usage of a local execution environment.

26. The computer program product of claim 25, wherein the means for enabling the computer system to instantiate one or more service objects is based on the alarm indication.

\* \* \* \* \*